United States Patent
Norieda et al.

(10) Patent No.: US 11,199,946 B2
(45) Date of Patent: Dec. 14, 2021

(54) INFORMATION PROCESSING APPARATUS, CONTROL METHOD, AND PROGRAM

(71) Applicant: NEC Corporation, Tokyo (JP)

(72) Inventors: Shin Norieda, Tokyo (JP); Yoshinori Saida, Tokyo (JP); Satoshi Nishida, Tokyo (JP); Jun Sato, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/648,359

(22) PCT Filed: Sep. 11, 2018

(86) PCT No.: PCT/JP2018/033598
§ 371 (c)(1),
(2) Date: Mar. 18, 2020

(87) PCT Pub. No.: WO2019/059044
PCT Pub. Date: Mar. 28, 2019

(65) Prior Publication Data
US 2020/0225814 A1 Jul. 16, 2020

(30) Foreign Application Priority Data
Sep. 20, 2017 (JP) .............................. JP2017-179849

(51) Int. Cl.
G06F 3/0482 (2013.01)
G06F 3/0487 (2013.01)

(52) U.S. Cl.
CPC .......... G06F 3/0482 (2013.01); G06F 3/0487 (2013.01)

(58) Field of Classification Search
CPC .............................. G06F 3/0482; G06F 3/0487
See application file for complete search history.

(56) References Cited

U.S. PATENT DOCUMENTS 8,217,856 B1* 7/2012 Petrou ..................... G06F 3/011
345/8
8,467,133 B2* 6/2013 Miller ..................... G06F 3/005
359/630

(Continued)

FOREIGN PATENT DOCUMENTS

JP 2002-287815 A 10/2002
JP 2014-142751 A 8/2014

(Continued)

OTHER PUBLICATIONS

International Search Report for PCT Application No. PCT/JP2018/033598, dated Nov. 27, 2018.

Primary Examiner — Daeho D Song
(74) Attorney, Agent, or Firm — Sughrue Mion, PLLC

(57) ABSTRACT

An information processing apparatus (2000) displays an operation image (20) on a display screen (50) associated with a head mounted display (100). First, the information processing apparatus (2000) acquires work information. The work information includes information for determining a work target which is a target of work performed by a user of the head mounted display (100). The information processing apparatus (2000) determines a work target satisfying a provision condition by using the work information. The information processing apparatus (2000) displays the operation image (20) for selecting the determined work target on the display screen (50) in an operable manner. The information processing apparatus (2000) detects an input operation on the operation image (20).

16 Claims, 27 Drawing Sheets

(56) References Cited

U.S. PATENT DOCUMENTS

| | | | |
|---|---|---|---|
| 8,482,527 B1* | 7/2013 | Kim | G06F 3/017 |
| | | | 345/168 |
| 8,847,850 B1* | 9/2014 | Cho | G02B 27/017 |
| | | | 345/7 |
| 9,389,420 B2* | 7/2016 | Maciocci | G06F 3/04842 |
| 9,792,710 B2* | 10/2017 | Kimura | G06T 11/60 |
| 9,928,650 B2* | 3/2018 | Inomata | G06F 3/04815 |
| 10,063,818 B1* | 8/2018 | Linnell | G03B 21/14 |
| 10,281,976 B2* | 5/2019 | Nishizawa | G02B 27/0172 |
| 2006/0050087 A1* | 3/2006 | Tanimura | G06T 19/006 |
| | | | 345/629 |
| 2010/0225566 A1* | 9/2010 | Sato | G06F 3/011 |
| | | | 345/8 |
| 2013/0027572 A1* | 1/2013 | Petrou | G02B 27/017 |
| | | | 348/220.1 |
| 2013/0335303 A1* | 12/2013 | Maciocci | G06F 3/017 |
| | | | 345/8 |
| 2014/0306881 A1* | 10/2014 | Sugihara | G02B 27/017 |
| | | | 345/156 |
| 2015/0016777 A1* | 1/2015 | Abovitz | G02B 27/0172 |
| | | | 385/37 |
| 2015/0084840 A1* | 3/2015 | Kim | G06F 3/011 |
| | | | 345/8 |
| 2015/0379770 A1* | 12/2015 | Haley, Jr. | G06T 19/006 |
| | | | 345/633 |
| 2016/0055676 A1* | 2/2016 | Kasahara | G06T 19/006 |
| | | | 345/633 |
| 2017/0010662 A1* | 1/2017 | Nishizawa | G06F 3/011 |
| 2017/0277222 A1* | 9/2017 | Matsuzawa | G06F 1/1647 |
| 2018/0024623 A1* | 1/2018 | Faaborg | G06F 3/04815 |
| | | | 345/156 |
| 2018/0136718 A1* | 5/2018 | Im | G02B 27/017 |
| 2018/0140362 A1* | 5/2018 | Cal | A61B 34/20 |
| 2018/0150186 A1 | 5/2018 | Norieda et al. | |
| 2018/0253149 A1 | 9/2018 | Norieda et al. | |
| 2018/0345491 A1* | 12/2018 | Iwamoto | B25J 9/1656 |
| 2018/0374026 A1* | 12/2018 | Osawa | G06F 3/038 |
| 2019/0130183 A1* | 5/2019 | Yoshida | G05D 23/1917 |
| 2019/0220080 A1* | 7/2019 | Lehtiniemi | G06F 1/163 |
| 2019/0333109 A1* | 10/2019 | Teller | G06Q 30/0267 |
| 2020/0286259 A1* | 9/2020 | Oami | H04N 5/23222 |

FOREIGN PATENT DOCUMENTS

| | | |
|---|---|---|
| JP | 2014-206904 A | 10/2014 |
| JP | 2015-504616 A | 2/2015 |
| JP | 2016-085554 A | 5/2016 |
| JP | 2017-134575 A | 8/2017 |
| WO | 2014/162825 A1 | 10/2014 |
| WO | 2016/185845 A1 | 11/2016 |
| WO | 2017/145423 A1 | 8/2017 |

* cited by examiner

FIG. 9
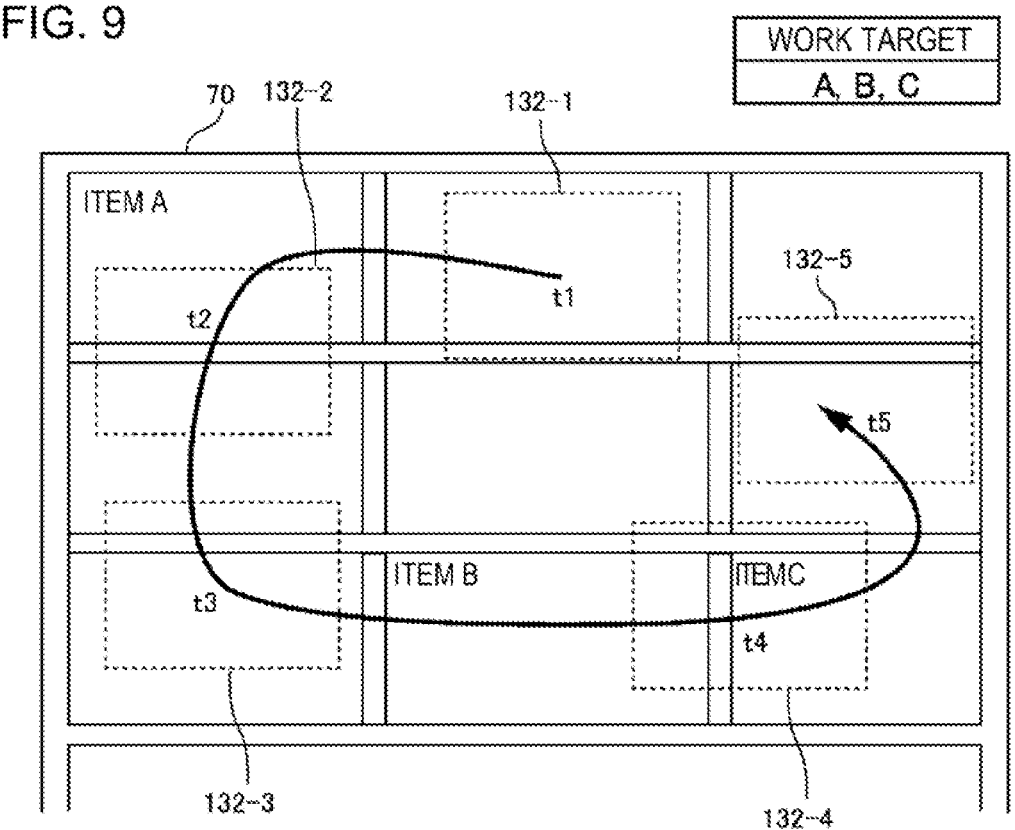
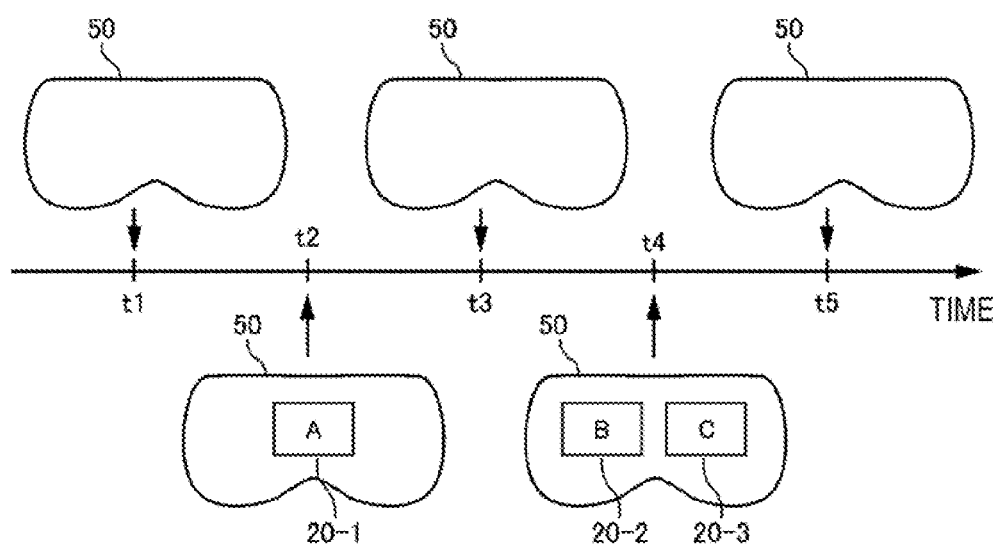

FIG. 13
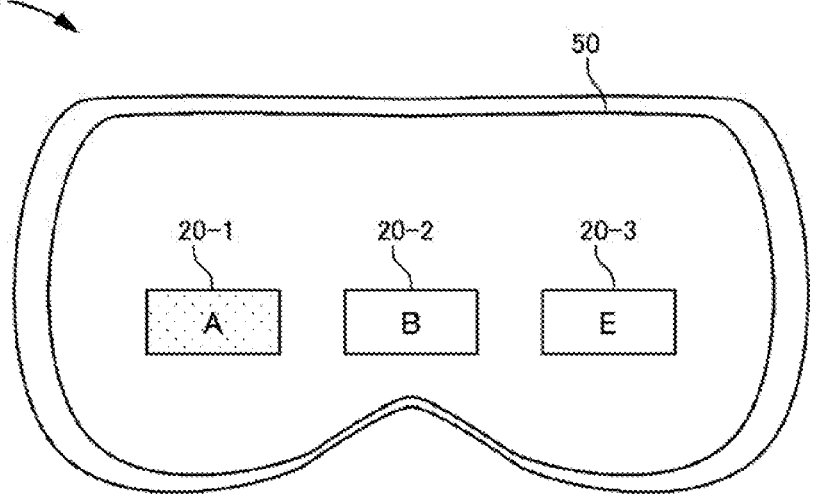
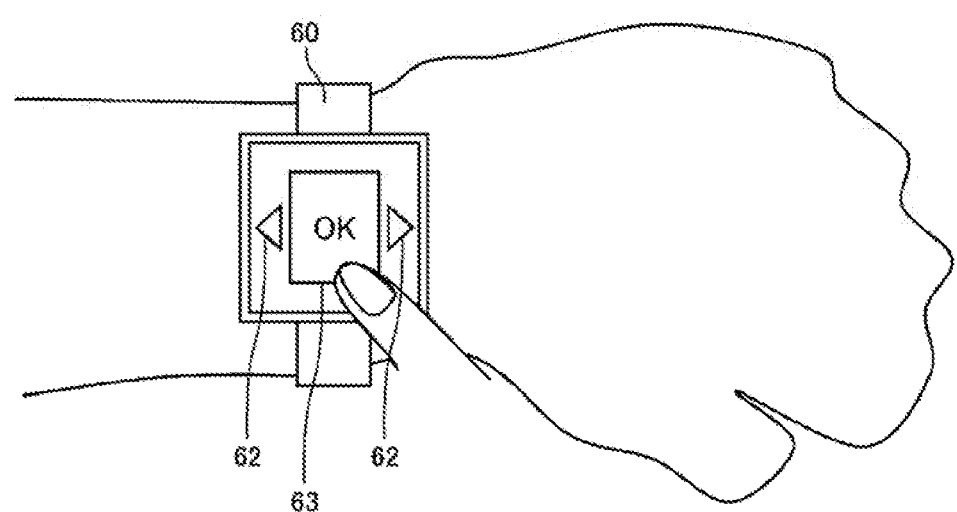

FIG. 17
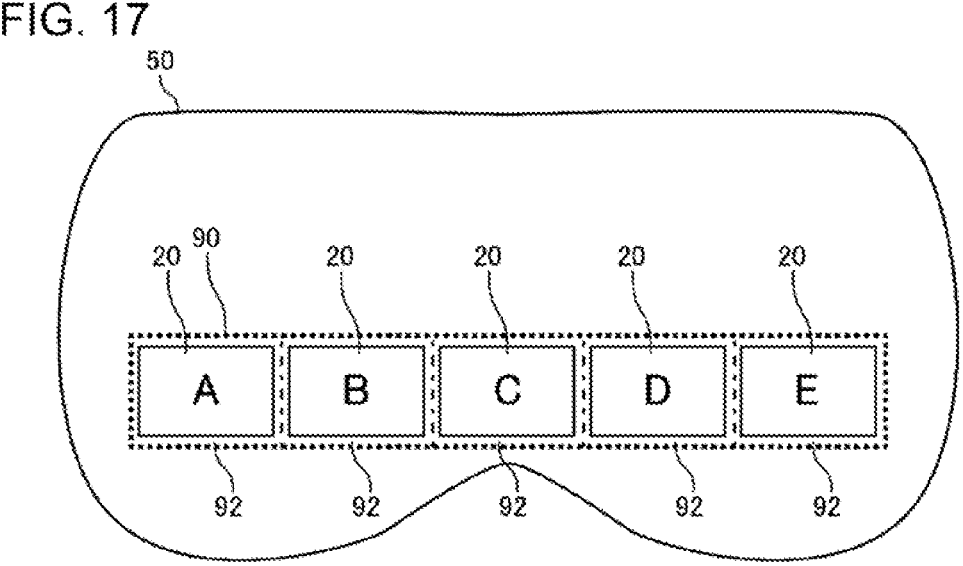
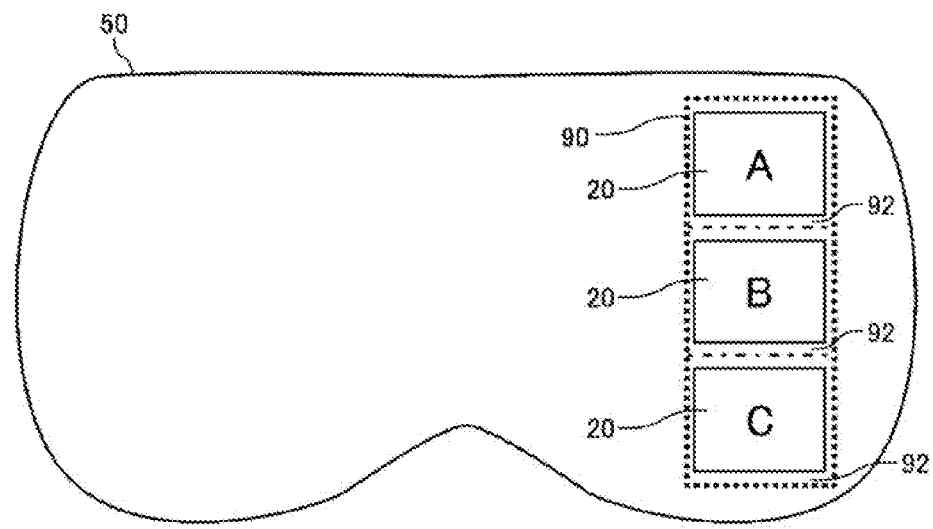

FIG. 18
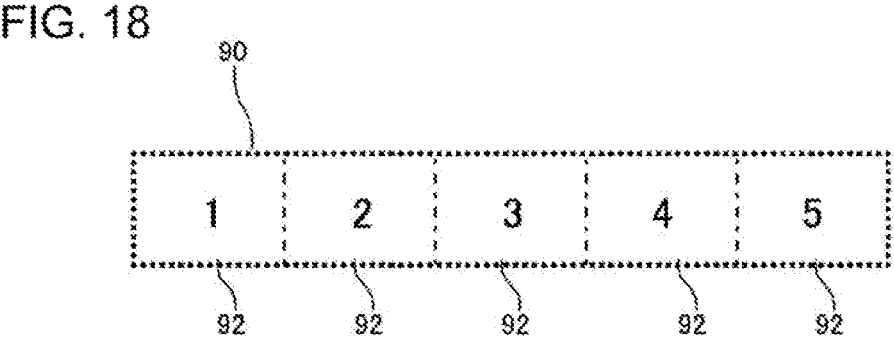
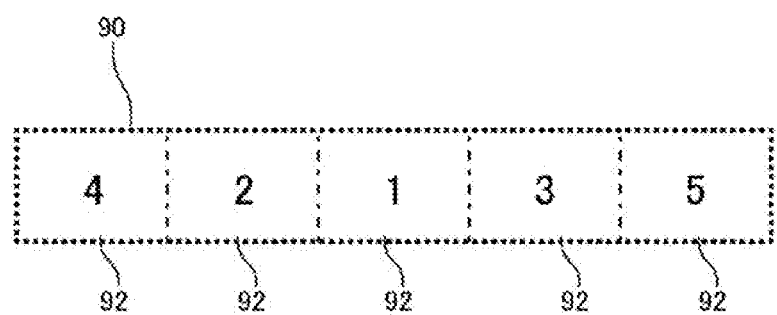

FIG. 19
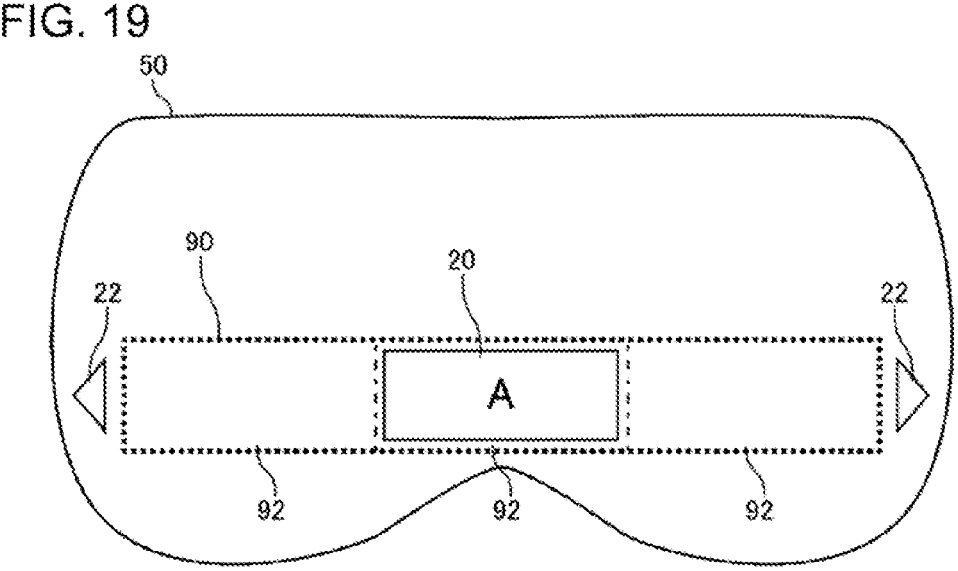
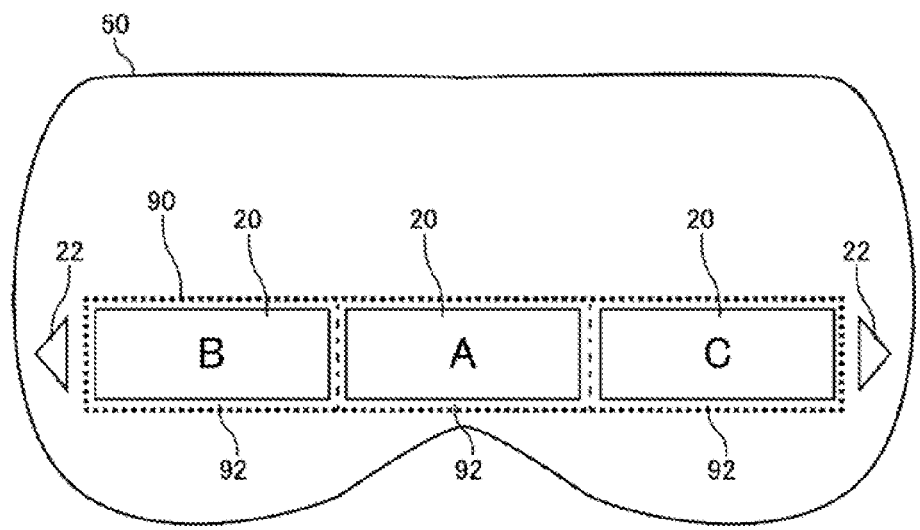
*NUMBER OF OPERATION IMAGES 20 TO BE DISPLAYED IS FIVE FIG. 25
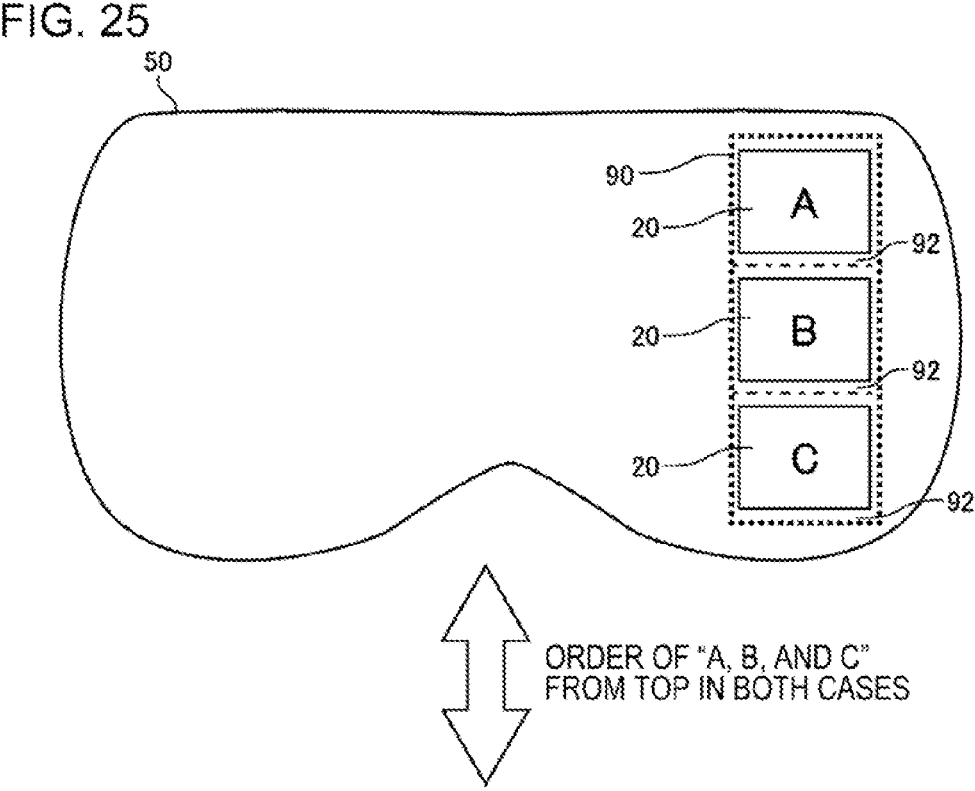
ORDER OF "A, B, AND C" FROM TOP IN BOTH CASES
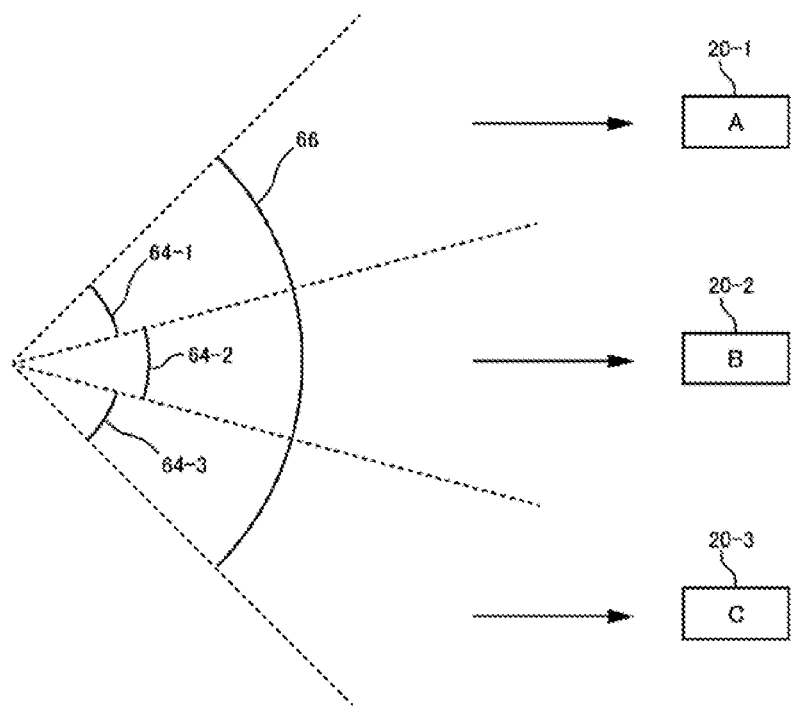

INFORMATION PROCESSING APPARATUS, CONTROL METHOD, AND PROGRAM

This application is a National Stage Entry of PCT/JP2018/033598 filed on Sep. 11, 2018, which claims priority from Japanese Patent Application 2017-179849 filed on Sep. 20, 2017, the contents of all of which are incorporated herein by reference, in their entirety.

TECHNICAL FIELD

The present invention relates to a user interface.

BACKGROUND ART

Various user interfaces have been developed. For example, an interface has been developed in which an image displayed by a computer appears to be present in a real space to a user by using a head mounted display or the like.

For example, Patent Document 1 discloses a technique of displaying a virtual keyboard on a head mounted display. Patent Document 2 discloses a technique of virtually attaching an annotation to an object on a real space viewed through a head mounted display by using a tablet terminal cooperating with the head mounted display. Patent Document 3 discloses a technique of displaying a menu screen on the palm or changing the menu screen according to a gesture (for example, a gesture of opening the palm) of the palm of a user.

RELATED DOCUMENT

Patent Document

[Patent Document 1] PCT Japanese Translation Patent Publication No. 2015-504616
[Patent Document 2] International Publication No. WO2014/162825
[Patent Document 3] Specification of U.S. Unexamined Patent Publication No. 2015/0016777
[Patent Document 4] International Publication No. WO2016/185845

SUMMARY OF THE INVENTION

Technical Problem

It has been examined that work using a head mounted display can be performed more efficiently. One of objects of the present invention is to provide a technique of increasing efficiency of work using a head mounted display.

Solution to Problem

According to the present invention, there is provided a first information processing apparatus including 1) a provision control unit that determines a work target satisfying a provision condition by using work information indicating a work target which is a target of work performed by a user, and displays an operation image for selecting the determined work target on a display screen associated with a head mounted display in an operable manner; and 2) an input detection unit that detects an input operation on the displayed operation image.

According to the present invention, there is provided a second information processing apparatus including 1) a provision control unit that determines a work target satisfying a provision condition by using work information indicating a work target which is a target of work performed by a user, and outputs a voice representing the determined work target from a speaker associated with a head mounted display; and 2) an input detection unit that detects an input operation on the work target satisfying the provision condition.

According to the present invention, there is provided a control method executed by a computer. The control method includes 1) a provision control step of determining a work target satisfying a provision condition by using work information indicating a work target which is a target of work performed by a user, and displaying an operation image for selecting the determined work target on a display screen associated with a head mounted display in an operable manner; and 2) an input detection step of detecting an input operation on the displayed operation image.

According to the present invention, there is provided a program causing a computer to execute each step of the control method of the present invention.

Advantageous Effects of Invention

According to the present invention, it is possible to provide a technique of increasing efficiency of work using a head mounted display.

BRIEF DESCRIPTION OF THE DRAWINGS

The above-described object, and other objects, features, and advantages will become apparent throughout preferable example embodiments described below and the accompanying drawings.

FIG. 9 is a first diagram illustrating a display change in the display screen.

FIG. 13 is a diagram illustrating an input operation performed by using the watch type device on an operation image displayed on a display screen of the head mounted display.

FIG. 17 is a diagram illustrating a case where a layout of operation images is determined according to the number of operation images.

FIG. 18 is a diagram illustrating a rule in which ranks are assigned to partial areas generated by dividing an area in a row.

FIG. 19 is a diagram illustrating an area that is divided in a fixed manner in advance.

FIG. 25 is a diagram illustrating a case where a layout of operation images is determined on the basis of an association between an operation image and a range.

DESCRIPTION OF EMBODIMENTS

Figure 1:
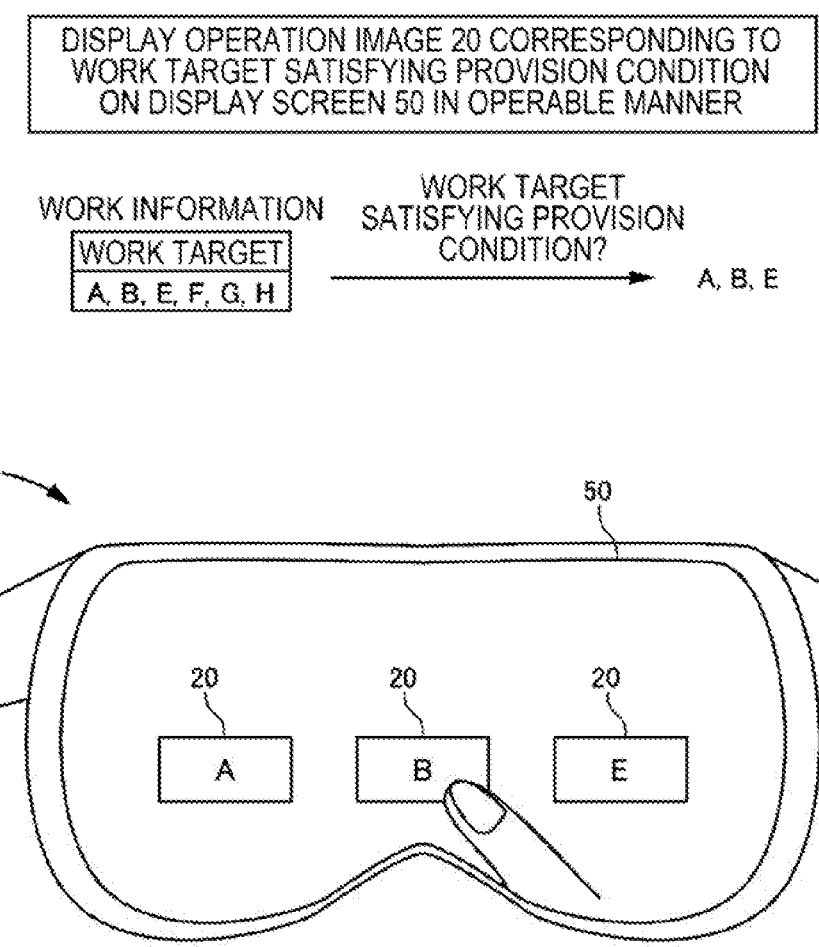
FIG. 1 is a diagram conceptually illustrating an operation of an information processing apparatus according to Example Embodiment 1.

Hereinafter, example embodiments of the present invention will be described with reference to the drawings. The same constituent elements are given the same reference numerals throughout all the drawings, and description thereof will not be repeated as appropriate. In each block diagram, unless particularly mentioned, each block indicates not a configuration in the hardware unit but a configuration in the functional unit.

Example Embodiment 1

<Outline>

Figure 2:
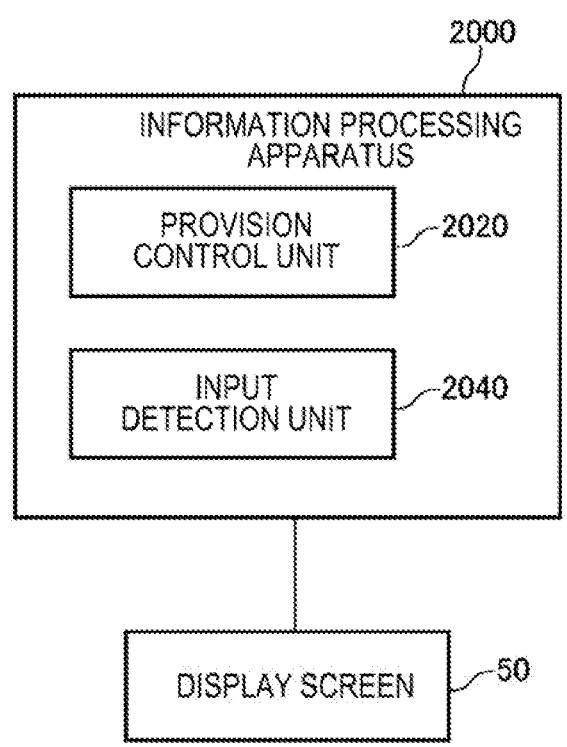
FIG. 2 is a diagram illustrating a functional configuration of the information processing apparatus.

FIG. 1 is a conceptually illustrating an operation of an information processing apparatus (an information processing apparatus 2000 whose configuration is illustrated in FIG. 2) according to Example Embodiment 1. Here, an operation of the information processing apparatus 2000 described with reference to FIG. 1 is an example for better understanding of the information processing apparatus 2000, and is not intended to limit an operation of the information processing apparatus 2000. Details or variations of an operation of the information processing apparatus 2000 will be described later.

The information processing apparatus 2000 displays an operation image 20 on a display screen 50 associated with a head mounted display 100. The information processing apparatus 2000 detects an input operation on the operation image. In FIG. 1, the display screen 50 controlled by the information processing apparatus 2000 is provided in the head mounted display 100. However, the display screen 50 is not necessarily is a display screen provided in the head mounted display 100.

In a case where the operation image 20 is displayed on the display screen 50, a user wearing the head mounted display 100 can view the operation image 20. The user performs an input operation on the operation image 20. A specific method of performing an input operation on the operation image 20 will be described later.

The information processing apparatus 2000 determines the operation image 20 to be displayed on the display screen 50 as follows. First, the information processing apparatus 2000 acquires work information. The work information includes information for determining a work target that is a target of work performed by the user of the head mounted display 100. The information processing apparatus 2000 determines a work target satisfying a provision condition by using the work information. The information processing apparatus 2000 displays the operation image 20 for selecting the determined work target on the display screen 50 in an operable manner. Hereinafter, an operation image 20 for selecting a work target will be referred to as "the operation image 20 corresponding to the work target". Similarly, a work target that is selectable by using an operation image 20 will be referred to as "the work target corresponding to the operation image 20".

Here, various work targets may be handled as the "work targets". For example, it is assumed that work performed by the user is work of taking out an object (for example, a medicine displayed on a medicine shelf) stored in a storage location. In this case, the work target is an object to be taken out through work. Other examples of the work target will be described later.

Here, the operation image 20 corresponding to a work target not satisfying the provision condition may not be displayed on the display screen 50, or may be displayed in an inoperable manner on the display screen 50. The operable operation image 20 and the inoperable operation image 20 are preferably displayed in a visually identifiable manner. As a technique of displaying the operable operation image 20 and the inoperable operation image 20 in a visually identifiable manner, an existing technique such as a technique of displaying a pressable button and a non-pressable button in an identifiable manner may be used.

According to the information processing apparatus 2000 of the present example embodiment, the operation image 20 corresponding to only a work target satisfying the provision condition is displayed in an operable manner. Thus, the operation images 20 that are operable by the user are displayed to be appropriately narrowed down compared with a case where the operation images 20 corresponding to all work targets that are targets of work of the user are displayed in an operable manner. Thus, the efficiency of work using the head mounted display 100 is increased for the user.

Particularly, when the operation image 20 not satisfying the provision condition is not displayed on the display screen 50, the operation images 20 displayed on the display screen 50 can be appropriately narrowed down. Therefore, the visibility of the operation images 20 is improved for the user, and thus the efficiency of work using the head mounted display 100 is increased.

In a case where the operation images 20 are displayed on the display screen provided in the head mounted display 100, when the number of operation images 20 displayed on the display screen is too large, a surrounding scene is difficult to view. According to the information processing apparatus 2000 of the present example embodiment, the operation images 20 displayed on the display screen 50 are appropriately narrowed down, and thus it is easy for the user to easily view a surrounding scene. Therefore, work efficiency is also improved in terms of this fact.

Hereinafter, the information processing apparatus 2000 of the present example embodiment will be described in more detail. Note that, unless particularly mentioned, in the following description, a description will be made of a case where the operation image 20 corresponding to a work target not satisfying a provision condition is not displayed on the display screen 50. However, a case where the operation image 20 corresponding to a work target not satisfying a provision condition is displayed in an inoperable manner on the display screen 50 may be realized by the same technique as a technique described below.

<Example of Functional Configuration>

FIG. 2 is a diagram illustrating a functional configuration of the information processing apparatus 2000. The information processing apparatus 2000 includes a provision control unit 2020 and an input detection unit 2040. The provision control unit 2020 displays the operation image 20 on the display screen 50 associated with the head mounted display 100. Specifically, the provision control unit 2020 determines a work target satisfying a provision condition by using work information, and displays the operation image 20 for selecting the determined work target on the display screen 50. The input detection unit 2040 detects an operation on the operation image 20 displayed on the display screen 50.

<Example of Hardware Configuration of Information Processing Apparatus 2000>

Each functional configuration unit of the information processing apparatus 2000 may be realized by hardware (for example, a hardwired electronic circuit), or may be realized by a combination of hardware and software (for example, a combination of an electronic circuit and a program for controlling the electronic circuit). Hereinafter, a further description will be made of a case where each functional configuration unit of the information processing apparatus 2000 is realized by a combination of hardware and software.

A computer 1000 is various computers. For example, the computer 1000 is a personal computer (PC), a server machine, a tablet terminal, or a smart phone. For example, the computer 1000 may be the head mounted display 100. The computer 1000 may be a dedicated computer designed to realize the information processing apparatus 2000, or may be a general-purpose computer.

Figure 3:
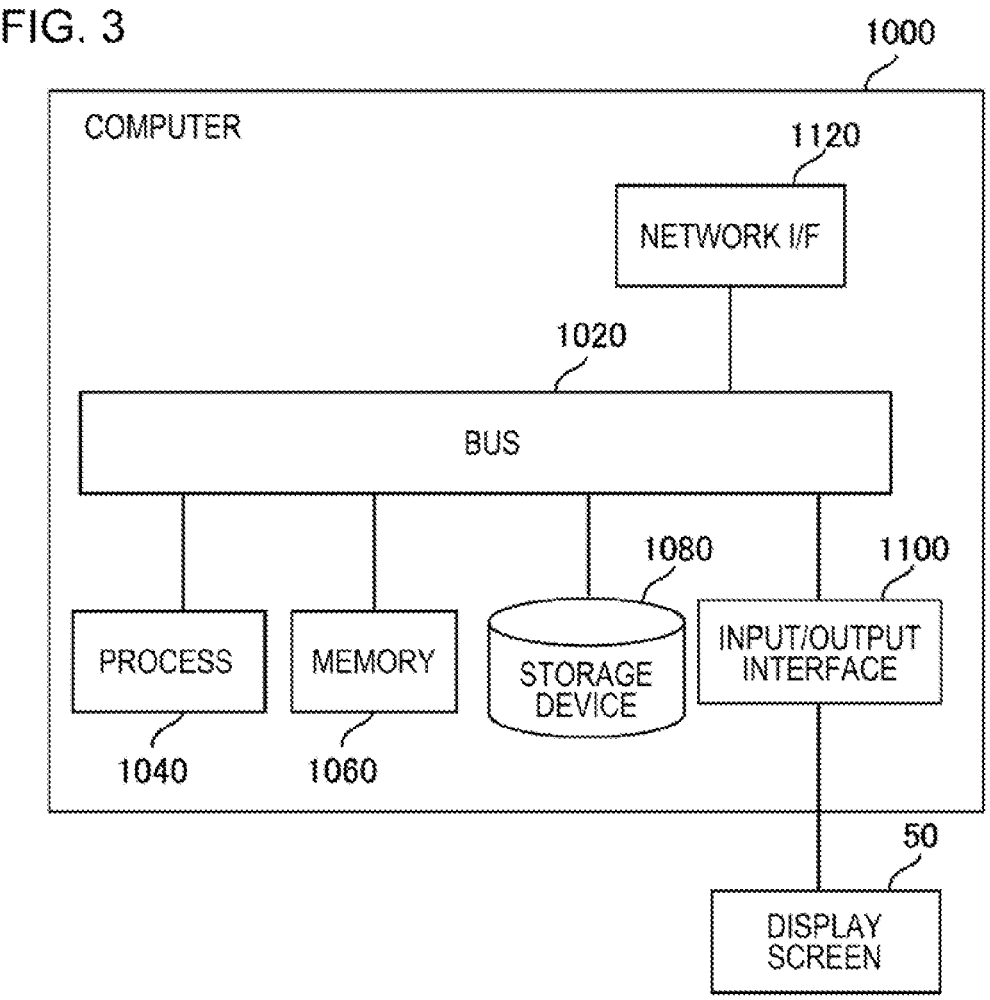
FIG. 3 is a diagram illustrating a configuration of a computer implementing the information processing apparatus.

FIG. 3 is a diagram illustrating a configuration of the computer 1000 realizing the information processing apparatus 2000. The computer 1000 includes a bus 1020, a processor 1040, a memory 1060, a storage device 1080, and an input/output interface 1100. The bus 1020 is a data transmission path for transmitting and receiving data among the processor 1040, the memory 1060, and the storage device 1080. However, a method of connecting the processor 1040 and the like to each other is not limited to connection using a bus. The processor 1040 is, for example, a calculation processing device such as a central processing unit (CPU) or a graphics processing unit (GPU). The memory 1060 is a main storage device realized by a random access memory (RAM) or the like. The storage device 1080 is an auxiliary storage device realized by a hard disk, a solid state drive (SSD), a memory card, or a read only memory (ROM).

The input/output interface 1100 connects the computer 1000 to input and output devices. In FIG. 3, the input/output interface 1100 is connected to the display screen 50.

The storage device 1080 stores a program module for realizing each function of the information processing apparatus 2000. The processor 1040 executes each program module so as to realize each function corresponding to the program module.

<<Head Mounted Display 100>>

The head mounted display 100 is any head mounted display having a display screen located in a user's view. For example, the display screen of the head mounted display 100 may be a transmissive display screen, or may be a non-transmissive display screen. In the former case, the user can view both a real object in front of the display screen and an image (for example, an operation image) displayed on the display screen. In the latter case, the head mounted display 100 displays an image captured by a camera imaging surroundings (for example, a face direction of the user) of the user and an image (for example, an operation image) representing other items in an overlapping manner on the display screen. The user views the display screen and can thus view a scene in which other items overlap surrounding scenery.

Figure 4:
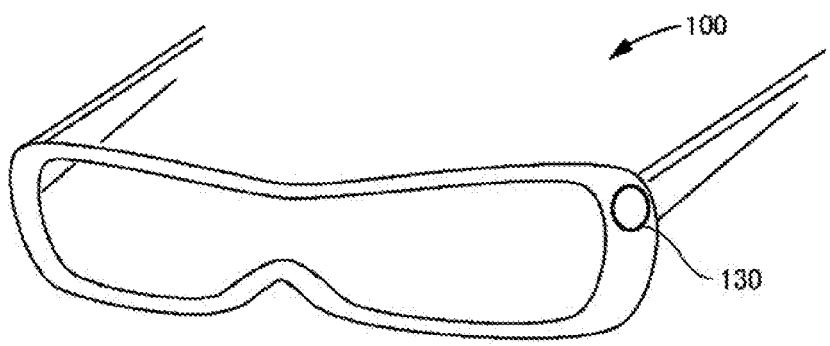
FIG. 4 is a diagram illustrating a head mounted display provided with a camera.

The camera imaging the periphery of the user is provided, for example, in the head mounted display 100. FIG. 4 is a diagram illustrating the head mounted display 100 provided with the camera. In FIG. 4, the camera is represented by the reference numeral 130. The camera 130 is any camera generating a plurality of captured images by performing repeated imaging. The plurality of captured images are a time series of video frames forming video data. Note that the camera 130 may be two-dimensional (2D) camera, or may be a three-dimensional (3D) camera.

The camera 130 may be provided at locations other than the head mounted display 100. For example, the camera 130 is attached to an object (for example, clothes of the user or an employee ID card held from the neck of the user) worn by the user. For example, the camera 130 may be provided on a wall or the like of a room in which the user uses the information processing apparatus 2000. In this case, an imaging range (an imaging direction or a zoom ratio) of the camera 130 is preferably changed through remote control using a remote controller.

<<Display Screen 50>>

There are various ways of realizing the display screen 50 controlled by the provision control unit 2020. For example, as described above, the display screen 50 is a display screen provided in the head mounted display 100. For example, the display screen 50 may be a display screen provided in another wearable device used along with the head mounted display 100. For example, it is assumed that a user of the head mounted display 100 uses a watch type wearable device (hereinafter, a watch type device) along with the head mounted display 100. In this case, a display screen of the watch type device may be handled as the display screen 50. In other words, the provision control unit 2020 displays the operation image 20 on the display screen of the watch type device.

For example, the display screen 50 may be a projection surface (a wall or the like) onto which an image is projected by a projector. In this case, the provision control unit 2020 controls the projector to project the operation image 20 onto the projection surface. For example, the display screen 50 may be a display screen of a display device such as a liquid crystal display.

<Flow of Process>

Figure 5:
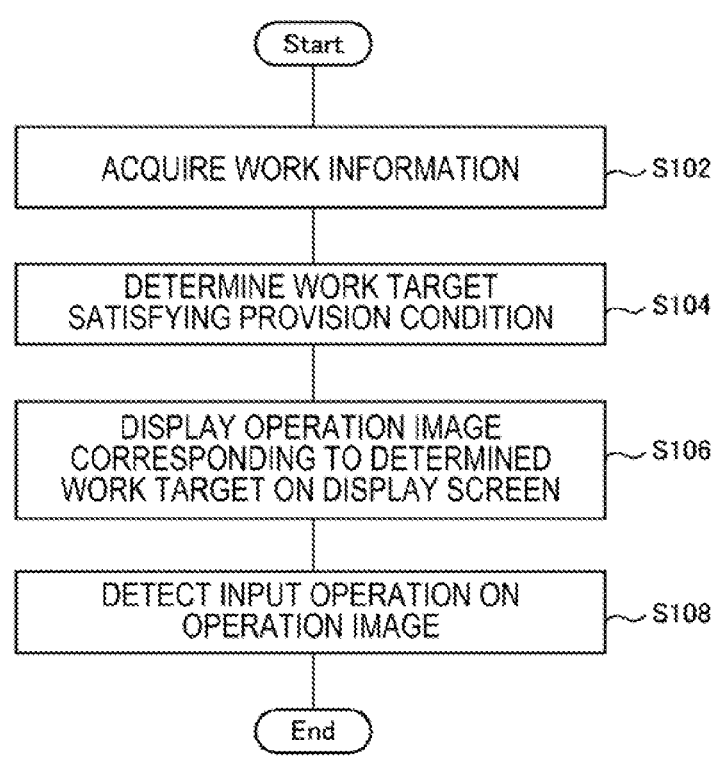
FIG. 5 is a flowchart illustrating a flow of a process executed by a provision control unit of Example Embodiment 1.

FIG. 5 is a flowchart illustrating a flow of a process performed by the provision control unit 2020 of Example Embodiment 1. The provision control unit 2020 acquires work information (S102). The provision control unit 2020 determines a work target satisfying a provision condition by using the work information (S104). The provision control unit 2020 displays the operation image 20 corresponding to the determined work target on the display screen 50 (S108). The input detection unit 2040 detects an input operation on the operation image 20 displayed on the display screen 50 (S110).

<Work Information>

The provision control unit 2020 acquires work information. As described above, the work information is information for determining a work target that is a target of work of a user of the head mounted display 100. The work information indicates at least identification information of a work target. Any work may be handled as work performed by the user. For example, work performed by the user is work of checking equipment or a facility, or work of taking out an object from a storage location such as a shelf.

The work information is stored in advance in a storage unit provided inside or outside the information processing apparatus 2000. The provision control unit 2020 acquires and uses the work information from the storage unit.

The work information may be work information prepared for each user, or may be work information shared by a plurality of users. In the latter case, for example, the work information is prepared for each group formed by a plurality of users. For example, the work information may be work information shared by all users.

In a case where the work information is prepared for each user, the provision control unit 2020 acquires the work information of a user using the head mounted display 100. In a case where the work information is prepared for each group, the provision control unit 2020 acquires the work information of a group to which a user using the head mounted display 100 belongs. Note that, in a case where information is prepared for each user or group, a specific technique for acquiring information corresponding to a target user may employ various existing techniques.

<Determination of Work Target Satisfying Provision Condition: S104>

The provision control unit 2020 determines a work target satisfying a provision condition (S104). For example, the provision control unit 2020 uses two conditions such as a provision start condition and a provision finish condition as the provision condition. The provision start condition is a condition to start a display of the operation image 20 of the work target whose corresponding operation image 20 is not displayed on the display screen 50. On the other hand, the provision finish condition is a condition to finish a display of the operation image 20 of the work target whose corresponding operation image 20 is displayed on the display screen 50.

The provision condition is satisfied when the provision start condition with respect to the work target whose corresponding operation image 20 is not displayed on the display screen 50 is satisfied. On the other hand, the provision condition is satisfied when the provision finish condition with respect to the work target whose corresponding operation image 20 is displayed on the display screen 50 is satisfied.

Figure 6:
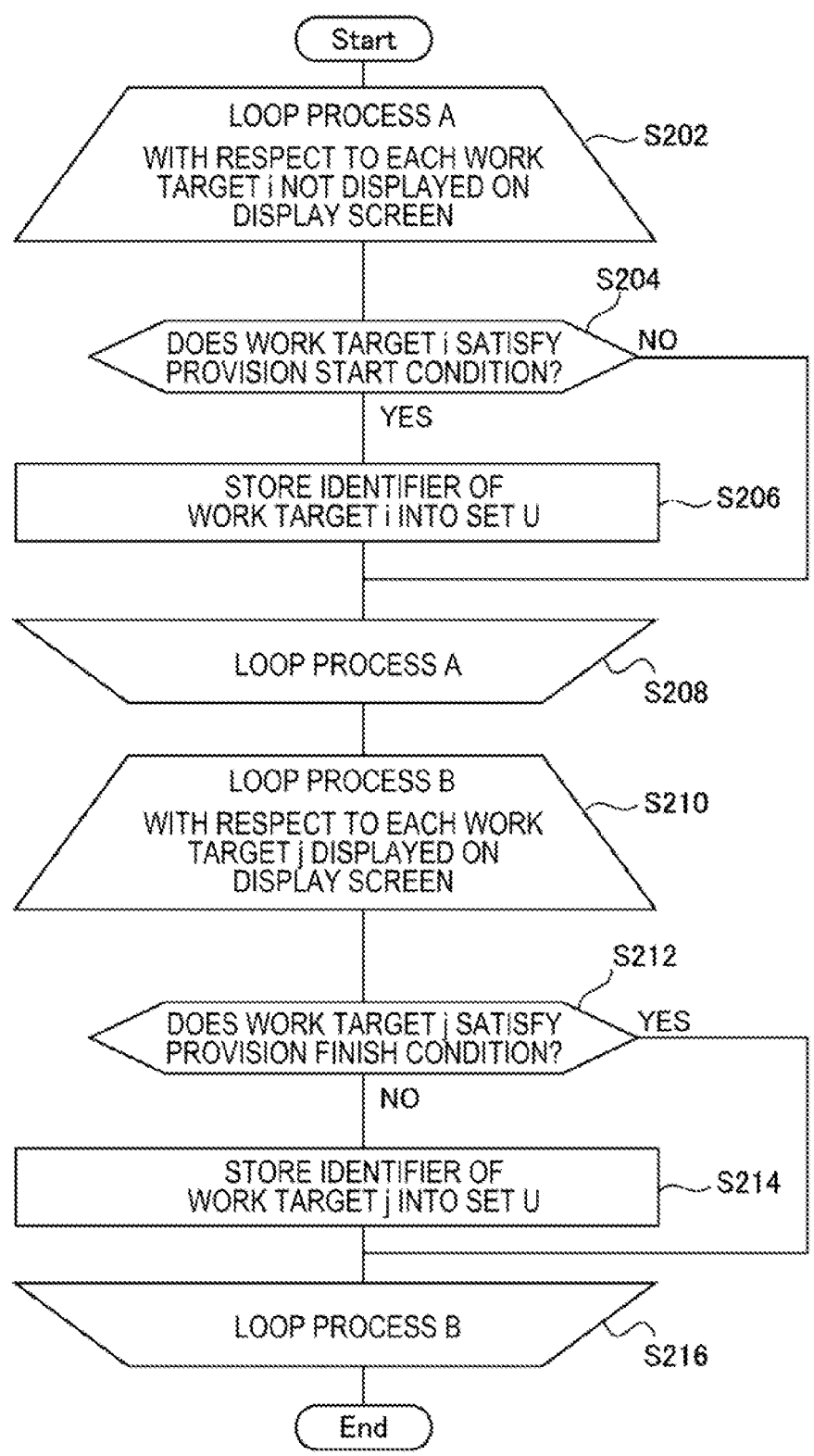
FIG. 6 is a flowchart illustrating a flow of a process of determining a work target satisfying a provision condition by using a provision start condition and a provision finish condition.

FIG. 6 is a flowchart illustrating a flow of a process of the provision control unit 2020 determining a work target satisfying a provision condition by using a provision start condition and a provision finish condition. In FIG. 6, an identifier of a work target satisfying the provision condition is stored in a set U. In other words, the operation image 20 corresponding to a work target whose identifier is stored in the set U is displayed on the display screen 50. Note that an initial state of the set U is a null set.

First, in a loop process A, the provision control unit 2020 determines whether or not each work target for which the operation image 20 is not displayed on the display screen 50 satisfies a provision start condition (S204). The provision control unit 2020 puts the identifier of the work target determined as satisfying the provision start condition into the set U (S206).

Next, in a loop process B, the provision control unit 2020 determines whether or not each work target for which the operation image 20 is displayed on the display screen 50 satisfies a provision finish condition (S212). The provision control unit 2020 puts the identifier of the work target determined as not satisfying the provision finish condition into the set U (S214).

The identifiers stored in the set U after finishing the loop process A and the loop process B are all identifiers of that work targets satisfying the provision condition.

Note that the flow illustrated in FIG. 6 is an example, and a method in which the provision control unit 2020 determines a work target satisfying a provision condition is not limited to a method of using both of a provision start condition and a provision finish condition. For example, the provision control unit 2020 may determine whether or not each work target satisfies a provision start condition regardless of whether or not the corresponding operation image 20 is displayed on the display screen 50, and display the operation image 20 corresponding to a work target satisfying the provision start condition on the display screen 50. In this case, a provision finish condition is not necessary.

<Provision Start Condition>

The provision start condition may employ, for example, various conditions described below.

<<Example 1 of Provision Start Condition>>

For example, the provision start condition is a condition that "a work target is present within a predetermined range defined by a sensor". The sensor may be directly attached to a user's body, or may be provided in a device or the like worn by the user. For example, the sensor is a camera, a beacon, or a microphone.

The provision control unit 2020 determines a work target present within a predetermined range defined by the sensor. The provision control unit 2020 displays the operation image 20 corresponding to the determined work target on the display screen 50. Hereinafter, the "predetermined range defined by the sensor" will be referred to as a sensor range.

As the sensor range, various ranges may be used. For example, the sensor range is an imaging range of the camera 130. In this case, the sensor is the camera 130. The provision control unit 2020 determines whether or not a work target whose corresponding operation image 20 is displayed on the display screen 50 is located within an imaging range of the camera 130. The provision control unit 2020 displays the operation image 20 corresponding to the work target determined as being located within the imaging range of the camera 130 on the display screen 50.

Here, assuming that the camera 130 is provided to image a front direction of a user's face, "a work target being present within the imaging range of the camera 130" indicates that the work target is present in the front direction of the user's face. In other words, it is indicated that there is a high probability that the work target is located in the user's view. Therefore, the operation image 20 corresponding to the work target located in the user's view with a high probability can be displayed on the display screen 50. Other ranges that may be used as the sensor range will be described later.

<<Example 2 of Provision Start Condition>>

For example, the provision start condition is a condition that "a work target is present in a work place". For example, it is assumed that work of taking out a work target from a storage location is performed. In this case, when the work target is present in the storage location (the work target is in stock), the provision start condition is satisfied. Conversely, when the work target is not present in the storage location (the work target is not in stock), the provision start condition is not satisfied. Therefore, only in a case where a work target is present in a storage location, the operation image 20 corresponding to the work target is displayed on the display screen 50.

Whether or not a work target is present in a storage location may be recognized by acquiring information regarding items stored in the storage location. For example, it is assumed that an inventory management system managing whether or not there is inventory of each item is provided. It is assumed that an identifier of each work target is indicated by work information. In this case, the provision control unit 2020 retrieves the inventory management system by using an identifier of a work target, and thus determines whether or not the work target is present in a storage location.

For example, the provision control unit 2020 may acquire work information from the inventory management system at a certain time, and put the acquired work information into an internal storage device (for example, the memory 1060 or the storage 1080). In this case, the provision control unit 2020 may determine whether or not a work target is present in a storage location by using the work information stored in the storage device during a series of work performed by a user.

<<Example 3 of Provision Start Condition>>

For example, the provision start condition is a condition that "a work time of a user does not exceed a predetermined time associated with a work target". For example, among items as work targets, there may be an item (for example, a heavy item, a fragile item, a powerful medicine, or an expensive item) that is required to be handled with care. In a case where a user performs work for a long period of time, preferably, the user does not perform work regarding an item required to be handled with care for a reason such as a fatigue.

Therefore, a work target is associated with a predetermined time in advance. The corresponding operation image 20 is displayed on the display screen 50 with respect to only a work target for which a work time of a user does not exceed a corresponding predetermined time.

Here, there are various methods of defining a work time of a user. For example, the work time of the user is an elapsed time after the user starts work. The time may be an elapsed time after the head mounted display 100 is turned on, an elapsed time after work information is acquired, and an elapsed time after an input operation indicating starting of work using work information is received from the user. In another example, the work time of the user may be an elapsed time after the last break is finished. The elapsed time after the last break is finished may be, for example, an elapsed time from the last time at which the head mounted display 100 returns from a sleep mode or an elapsed time after an input operation indicating finishing of a break (indicating restarting of work) is received from the user.

The predetermined time associated with a work target may be individually associated with each work target, or may be collectively associated with a plurality of work targets. For example, in the latter case, the predetermined time is defined in association with a group of work targets or an attribute of a work target. The attribute of the work target is an attribute such as a heavy item, a fragile item, a powerful medicine, or an expensive item. A rank related to an attribute may be allocated to each work target. For example, ranks in five stages are prepared for an attribute such as a "weight", and one of the ranks in five stages is allocated to a work target according to a weight of the work target. The predetermined time is associated with each of the ranks in five stages of a weight. In the above-described way, a predetermined time associated with a certain work target is a predetermined time associated with a rank of the work target. Note that, as a ranked attribute, an attribute such as "fragile", the "degree of danger", or "preciousness" may be used.

The predetermined time corresponding to a work target may be indicated by work information, or may be managed in a database managing a work target.

<<Example 4 of Provision Start Condition>>

For example, the provision start condition is a condition that "the current time is included in a predetermined time period associated with a work target". As described above, among items as work targets, there may be an item that is required to be handled with care. Work regarding such an item required to be handled with care is not preferably performed late at night when a user tends to tire. In addition, it is preferable to handle some items at night, when the temperature is lower, than in the daytime, when the temperature is higher.

Therefore, a predetermined time period representing a time period in which work can be performed is associated with a work target in advance. The corresponding operation image 20 is displayed on the display screen 50 with respect to only a work target for which the current time is included in a corresponding predetermined time period.

Note that, as a method of associating a time period in which work can be performed with a work target, the same method as the method of associating a predetermined time with a work target may be used.

<<Example 5 of Provision Start Condition>>

For example, the provision start condition is a condition that "a health condition of a user satisfies a predetermined condition associated with a work target". As described above, among items as work targets, there may be an item that is required to be handled with care. Work regarding such an item required to be handled with care is preferably performed when a health condition of a user is favorable.

Therefore, a predetermined condition satisfied by a health condition of a user is associated with a work target in advance. The corresponding operation image 20 is displayed on the display screen 50 with respect to only a work target whose corresponding predetermined condition is satisfied.

The predetermined condition is a condition that, for example, "a health condition of a user is good". In this case, the provision control unit 2020 determines whether or not a health condition of a user is good. For example, the predetermined condition is a condition that "a rank of a health condition of a user is equal to or more than a predetermined value". The rank represents that a health condition becomes better as a rank becomes higher. In this case, the provision control unit 2020 determines one of a plurality of ranks corresponding to a health condition of the user. As a method of associating a predetermined condition regarding a health condition of the user with a work target, the same method as the method of associating a predetermined time with a work target may be used.

Note that a health condition of a user may be determined by using various index values (a pulse rate, a blood pressure, a blood flow rate, or the like) regarding the user's body. As a specific method of determining whether or not a health condition of a user is favorable by using an index value such as a pulse rate or ranking a health condition of a user, an existing technique may be used.

The various index values may be obtained from sensors (a pulse sensor, a blood pressure sensor, a blood flow sensor, and the like) worn by the user. The sensors may be directly attached to the user's body, or may be provided in a wearable device worn by the user. For example, in the latter case, the sensors may be built into a watch type wearable device.

Here, as will be described later, as one of specific manner in which the input detection unit 2040 detects a user's input operation, there is the manner using the technique disclosed in Patent Document 4. Patent Document 4 discloses, as one of the forms, the manner using a watch type device worn on a user's arm. In a case where the technique is used, the pulse sensor may be provided in a wearable device used to detect the user's input operation. Thus, a single wearable device can be used for a plurality of purposes such as determination of a health condition of a user and detection of an input operation, and thus there is an advantage in that it is possible to reduce the number of wearable devices worn by the user.

<<Example 6 of Provision Start Condition>>

For example, the provision start condition is a condition that "a provision finish condition is not satisfied". In this case, the provision control unit 2020 displays the operation image 20 corresponding to a work target not satisfying the provision finish condition on the display screen 50. In other words, in this case, the provision control unit 2020 keeps displaying the operation image 20 on the display screen 50 until the provision finish condition is satisfied with respect to a work target indicated by work information. The provision finish condition will be described below.

<Provision Finish Condition>

The provision finish condition may employ, for example, various conditions described below.

<<Example 1 of Provision Finish Condition>>

For example, the provision finish condition is a condition that "a predetermined time has elapsed after the corresponding operation image 20 starts to be displayed on the display screen 50". In this case, the provision control unit 2020 determines whether or not a predetermined time has elapsed from a time point at which the operation image 20 starts to be displayed on the display screen 50 with respect to a work target whose corresponding operation image 20 is displayed on the display screen 50. The provision control unit 2020 does not display, on the display screen 50, a work target for which it is determined that the predetermined time has elapsed from the time point at which the corresponding operation image 20 starts to be displayed on the display screen 50. The provision finish condition is used, and thus the operation image 20 corresponding to the work target satisfying a provision start condition is displayed on the display screen 50 only for the predetermined time.

<<Example 2 of Provision Finish Condition>>

For example, the provision finish condition is a condition that "a user performs a predetermined input operation on the operation image 20 corresponding to a work target". For example, the predetermined input operation is an input operation on the operation image 20, detected by the input detection unit 2040. In other words, the operation image 20 is displayed on the display screen 50 until an input operation on the operation image 20 is detected. In the above-described way, it is able not to display, on the display screen 50, the operation image 20 on which an input operation has already been performed.

In a case where work of a user is work of taking out a work target item from a storage location, when the user takes out the item from the storage location, there may be an application in which an input operation is performed on the operation image 20 corresponding to the item in order to record the fact. In this case, an input operation being performed on a certain operation image 20 indicates that an item corresponding to the operation image 20 has already been taken out from a storage location. Thus, it is not necessary to display the operation image 20 on the display screen 50. Therefore, a work target taken out from a storage location is regarded to satisfy a finish condition, and thus the operation image 20 corresponding to the work target may not be displayed on the display screen 50. Note that the provision finish condition in this example may be expressed as "work regarding the work target being finished".

<<Example 3 of Provision Finish Condition>>

For example, the provision finish condition is a condition that "a provision start condition is not satisfied (the provision start condition becomes not satisfied)". In this case, the provision control unit 2020 determines whether or not a work target displayed in the operation image 20 satisfies the provision start condition. In a case where it is determined that the work target does not satisfy the provision start condition, the provision control unit 2020 does not display the operation image 20 corresponding to the work target on the display screen 50. The provision finish condition is used, and thus the operation image 20 corresponding to the work target can be displayed on the display screen 50 only while the provision start condition for the work target is satisfied.

For example, the provision start condition is assumed to be a condition that "a work target is present within a sensor range". In this case, the provision start condition for a certain work target not being satisfied indicates that the work target is not present within the sensor range. Therefore, the operation image 20 corresponding to the certain work target is displayed on the display screen 50 only while the work target is present within the sensor range.

<<Example 4 of Provision Finish Condition>>

For example, the provision finish condition is a condition that "another condition is satisfied after a provision start had become not satisfied". In other words, in a case where another condition is satisfied after a provision start condition for a certain work target had become not satisfied, the provision control unit 2020 does not display the operation image 20 corresponding to the work target on the display screen 50. In the above-described way, the operation image 20 corresponding to a certain work target can be displayed on the display screen 50 until another condition is satisfied even after a provision start condition for the work target becomes not satisfied.

For example, another condition is a condition that "a predetermined time elapses from a time point at which a provision start condition becomes not satisfied". In this case, the provision control unit 2020 displays the operation image 20 corresponding to a certain work target on the display screen 50 until a predetermined time elapses after a provision start condition for the work target is not satisfied.

For example, the provision start condition is assumed to be a condition that "a work target is present within an imaging range of the camera 130". In this case, even though a certain work target is not present within an imaging range of the camera 130, the operation image 20 corresponding to the work target keeps displayed on the display screen 50 during that time (until a predetermined time elapses from the time point).

As described above, in work of taking out a work target from a storage location, the fact that the work target has been taken out may be recorded. In this case, assuming that the camera 130 performs imaging in a front direction of a user's face, when the user views an item stored in a storage location, the operation image 20 corresponding to the item is displayed on the display screen 50. Here, when the user performs an input operation on the operation image 20 displayed on the display screen 50, the user may want to change the direction of the face (for example, wants to direct the face downward). Thus, it is preferable that the operation image 20 keeps displayed on the display screen 50 for a while even though the user directs the face in other directions.

Therefore, in a case where the finish condition that "a predetermined time elapses from a time point at which a provision start condition is not satisfied" is used, the operation image 20 keeps displayed on the display screen 50 until the predetermined time elapses even though the user changes the direction of the face after taking out an item from a storage location. Therefore, the user can perform an input operation on the operation image 20 while freely changing the direction of the face after taking out the item from the storage location.

For example, another condition is a condition that "a predetermined input operation is performed on the operation image 20 corresponding to a work target after a provision start condition becomes not satisfied". In this case, in a case where a provision start condition for a certain work target becomes not satisfied, and then a predetermined operation is performed, the provision control unit 2020 does not display the operation image 20 corresponding to the work target on the display screen 50. In other words, even after a provision start condition for a certain work target becomes not satisfied, the provision control unit 2020 displays the operation image 20 corresponding to the work target on the display screen 50 until a predetermined operation is performed.

In a case where the condition is used, for example, as described above, an input operation can also be performed while changing a direction of the face after an item is taken out from a storage location. In a case where the condition is used, there is an advantage in that there is no restriction in time until a user performs an input operation.

For example, another condition is a condition that "there is another work target satisfying a provision start condition". In this case, when a provision start condition for a certain work target becomes not satisfied, and there is another work target satisfying the provision start condition, the provision control unit 2020 does not display the operation image 20 corresponding to the work target on the display screen 50. In other words, even after a provision start condition for a certain work target becomes not satisfied, the provision control unit 2020 keeps displaying the operation image 20 corresponding to the work target not satisfying the provision start condition on the display screen 50 as long as there is no other work target satisfying the provision start condition.

For example, the provision start condition is assumed to be a condition that "a work target is present within a predetermined range defined by a sensor worn by a user". In this case, the operation image 20 corresponding to a certain work target keeps displayed on the display screen 50 as long as another work target is not located within a predetermined range, even though the work target is not present within the predetermined range defined by a sensor worn by a user.

In a case where the condition is used, for example, as described above, an input operation can also be performed while changing a direction of the face after an item is taken out from a storage location. There is an advantage in that there is no restriction in time until a user performs an input operation.

Note that the provision control unit 2020 may determine that a provision condition is satisfied in a case where a provision start condition for a work target is satisfied once, or may determine that a provision condition is satisfied in a case where a situation in which a provision start condition for a work target is satisfied continues. In the latter case, for example, the provision control unit 2020 repeatedly determines whether or not the provision start condition for the work target is satisfied, and displays the operation image 20 corresponding to the work target only in a case where the provision start condition is repeatedly satisfied a predetermined number of times or more or in a case where the provision start condition is repeatedly satisfied for a predetermined time or more. In the method of displaying the operation image 20 corresponding to a work target in a case where a situation in which a provision start condition for the work target is satisfied continues, for example, there is an advantage in that, even in a case where the sensor cannot perform accurate sensing for some reason, the influence thereof can be reduced.

Similarly, the provision control unit 2020 may determine that a provision condition is not satisfied in a case where a provision finish condition for a work target is satisfied once, or may determine that a provision condition is not satisfied in a case where a situation in which a provision finish condition for a work target is satisfied continues. In the latter case, for example, the provision control unit 2020 repeatedly determines whether or not the provision finish condition for the work target is satisfied, and finishes display of the operation image 20 corresponding to the work target only in a case where the provision finish condition is repeatedly satisfied a predetermined number of times or more or in a case where the provision finish condition is repeatedly satisfied for a predetermined time or more. Consequently, as described above, there is an advantage in that, even in a case where the sensor cannot perform accurate sensing for some reason, the influence thereof can be reduced.

<Sensor Range>

As described above, as a condition included in a provision start condition, the condition that "a work target is included in a sensor range" may be used. Herein, a description will be made of various available sensor ranges and a method of determining whether or not a work target is included in a sensor range.

<<Example 1 of Sensor Range>>

For example, as a sensor range, a "predetermined range determined by using a captured image generated by the camera 130" may be used. As an example thereof, there is the "imaging range of the camera 130".

Figure 7:
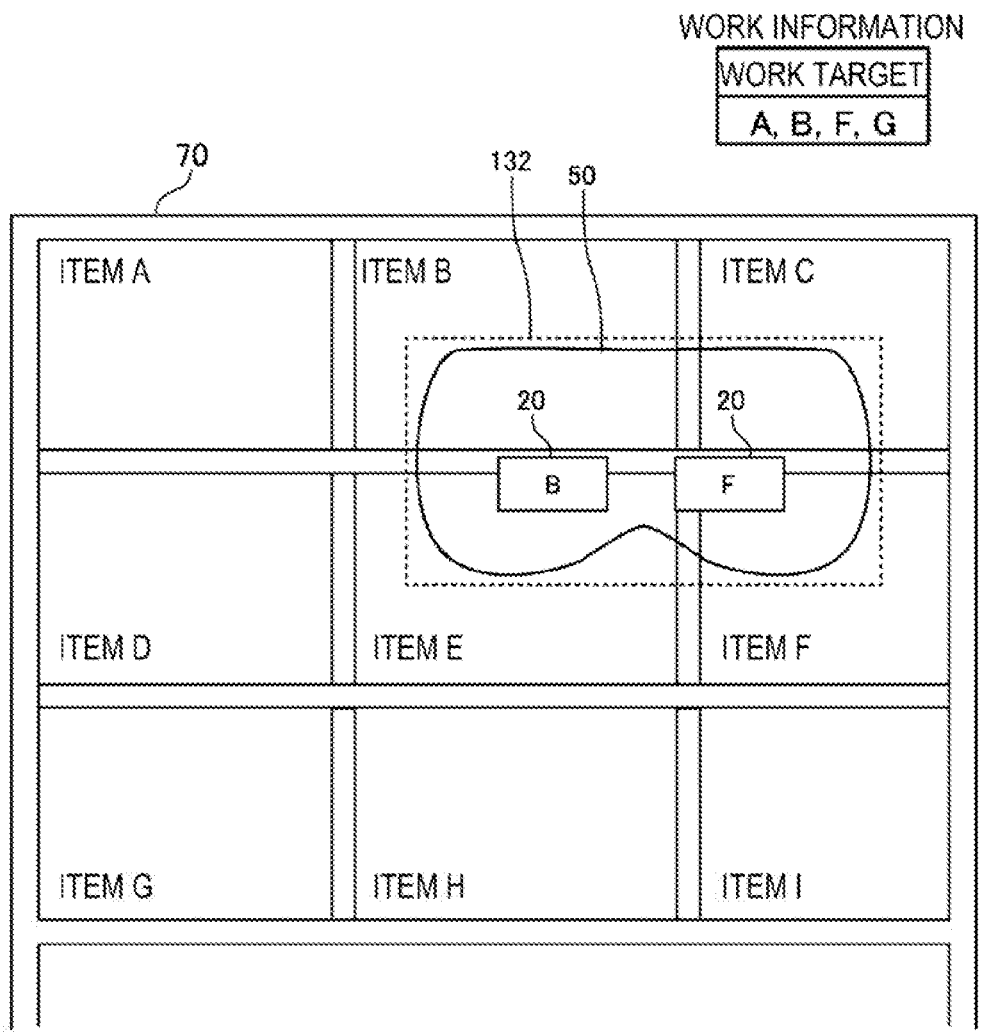
FIG. 7 is a diagram illustrating a scene in which an operation image corresponding to a work target included in an imaging range of the camera is displayed on a display screen.

FIG. 7 is a diagram illustrating a scene illustrating the operation image 20 corresponding to a work target included in an imaging range of the camera 130 is displayed on the display screen 50. In this example, various kinds of items are displayed on a shelf 70. For example, an item A is displayed in an upper left box of the shelf 70.

In this example, the display screen 50 and the camera 130 are provided in the head mounted display 100. An imaging range 132 represents an imaging range of the camera 130.

The imaging range 132 of the camera 130 is set to be the substantially same as a range viewed by a user through the display screen 50.

In this example, work information indicates items A, B, F, and G. Items B, C, E, and F are included in the imaging range 132. On the display screen 50, the work information is displayed, and the operation images 20 respectively corresponding to the items B and F included in the imaging range 132 are also displayed.

The provision control unit 2020 determines whether or not each work target indicated by the work information is included in the imaging range of the camera 130. Here, as a method of determining whether or not the work target is included in the imaging range of the camera 130, various methods may be used. For example, the provision control unit 2020 performs object recognition on a captured image generated by the camera 130, and thus determines whether or not a work target is included in the captured image. In a case where a certain work target is included in a captured image, the provision control unit 2020 determines that the work target is included in the imaging range of the camera 130. On the other hand, in a case where a certain work target is not included in the captured image, the provision control unit 2020 determines that the work target is not included in the imaging range of the camera 130.

In a case where a work target is detected by performing object recognition on a captured image, the work information further includes information for detecting the work target from the captured image for each work target. For example, the information is a feature value representing a feature of an appearance of a work target.

The provision control unit 2020 may detect a predetermined marker from a captured image, and determine whether or not a work target is included in the imaging range of the camera 130 by using the detected result. Hereinafter, a method thereof will be described in detail.

Figure 8:
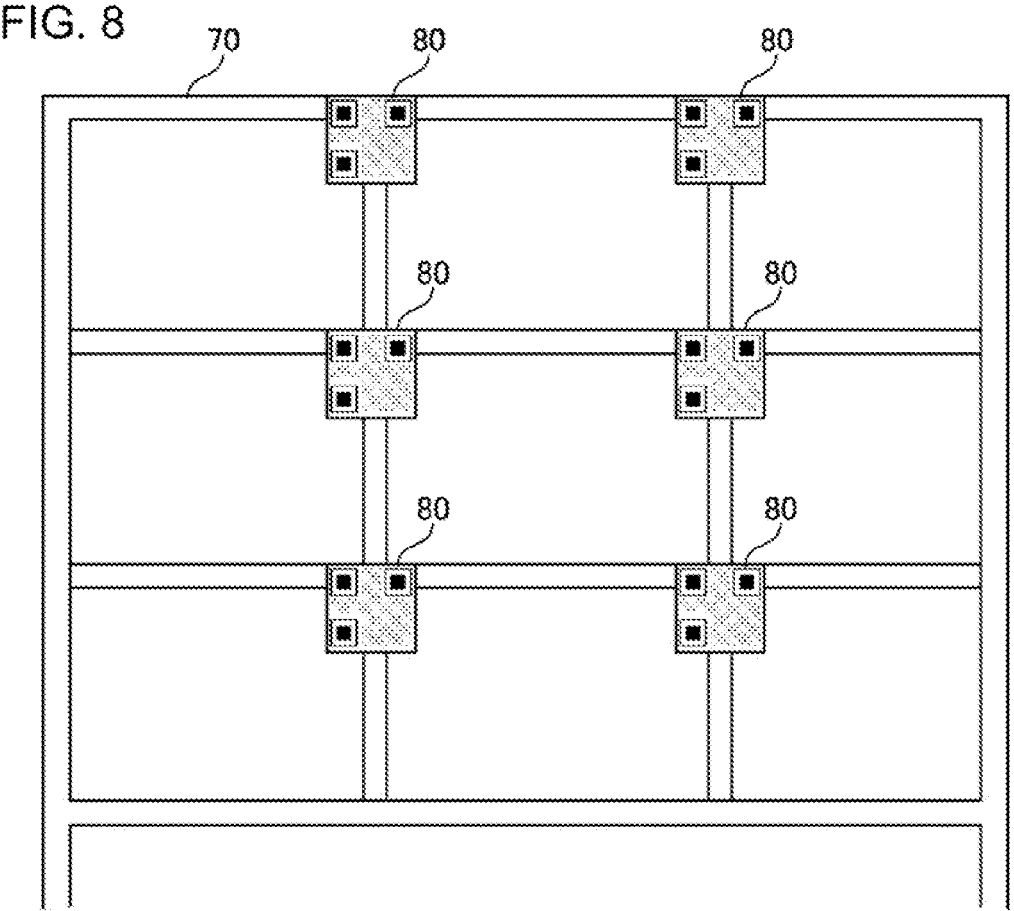
FIG. 8 is a diagram illustrating a marker.

FIG. 8 is a diagram illustrating a marker. The marker is set at a location where a user performs work. In the example illustrated in FIG. 8, a marker 80 is added to the shelf 70. The number of markers 80 may be one, or may be plural. However, when a user faces the location where work is performed, the marker 80 is preferably disposed such that at least one marker 80 is included in the imaging range 132. In a case where a plurality of markers 80 are provided, the markers are different from each other to be discriminated.

The marker 80 may be used to determine a predetermined space. Here, the predetermined space may be a two-dimensional space, or may be a three-dimensional space. The predetermined space may be a real space, or may be a virtual space.

As a technique of determining a predetermined space by using a marker, an existing technique may be used. For example, there is a technique in which a predetermined space with an augmented reality (AR) marker as a reference is determined on the basis of a position, a size, and a shape of the AR marker imaged by a camera. The marker 80 is not limited to a marker imitating QR Code (registered trademark) illustrated in FIG. 8 as long as a predetermined space can be determined on the basis of a position, a size, and a shape thereof.

The imaging range 132 of the camera 130 may be determined as a part of a predetermined space determined by the marker 80 by using a position, a size, and a shape of the marker 80 detected from a captured image, and a parameter (an angle of view or the like) regarding the camera 130. Here, in a case where a plurality of markers 80 are provided, different positions (coordinates) in a predetermined space may be respectively allocated to the plurality of markers 80. Hereinafter, in the predetermined space, a space included in the imaging range of the camera 130 will be referred to as a partial space.

Target information indicates a position of a work target in the predetermined space. The provision control unit 2020 determines whether or not, with respect to a work target indicated by the target information, a position thereof is included in a partial space determined according to the method. In a case where the position of the work target in the predetermined space is included in the partial space, the provision control unit 2020 determines that the work target is included in the imaging range of the camera 130. On the other hand, in a case where the position of the work target in the predetermined space is not included in the partial space, the provision control unit 2020 determines that the work target is not included in the imaging range of the camera 130.

Here, the sensor range may be not the whole of the imaging range 132 but a part (predetermined portion) of the imaging range 132. In this case, for example, the provision control unit 2020 determines whether or not a work target is included in the sensor range by determining whether or not the work target is included in a predetermined region (a portion corresponding to the predetermined portion of the imaging range 132) of a captured image 134. For example, in a case where the marker 80 is used, the provision control unit 2020 handles a space corresponding to a predetermined portion of the imaging range 132 in a predetermined space determined by the marker 80 as the partial space. In the above-described way, it is determined whether or not a work target is included in a partial space, and thus it can be determined whether or not the work target is included in a predetermined portion of the imaging range 132.

<<Example 2 of Sensor Range>>

A sensor for defining a sensor range may be devices other than the camera 130. For example, as the sensor, a combination of a transmitter transmitting a predetermined signal and a receiver receiving the signal may be used. As the transmitter, a so-called beacon may be used. As the receiver, a receiver receiving a signal transmitted from the beacon may be used.

For example, transmitters transmitting identifiers thereof are provided at a plurality of locations in the shelf 70. A receiver receiving the signals is provided in the head mounted display 100. Positions in a predetermined space are allocated to each receiver and a work target.

The provision control unit 2020 determines a position and a front direction of the head mounted display 100 in the predetermined space on the basis of a signal received by the receiver provided in the head mounted display 100, and thus determines a sensor range in the predetermined space. For example, the sensor range is defined in advance as a space that spreads at a predetermined angle with respect to the front direction of the head mounted display 100. The head mounted display 100 determines whether or not a position of each work target is included in the sensor range.

Such a method of defining a sensor range may be realized by using not only a beacon but also a combination of a speaker transmitting a predetermined sonic wave and a microphone receiving the sonic wave.

<Display of Operation Image 20 Corresponding to Determined Work Target: S108>

The provision control unit 2020 displays the operation image 20 corresponding to a work target determined as satisfying the provision condition on the display screen 50 (S108). To do so, the provision control unit 2020 acquires the operation image 20 corresponding to the work target. Any method of acquiring the operation image 20 corresponding to a work target may be used. For example, the operation image 20 corresponding to the work target is included in work information.

For example, the operation image 20 may be managed in association with a work target in a database or the like managing the work target. For example, in a case where a work target is an item, the operation image 20 is stored in association with an identifier of the item in a database or the like managing information regarding the item. The provision control unit 2020 retrieves the database with an identifier of a work target indicated by work information, and thus acquires the operation image 20 corresponding to the work target.

For example, the operation image 20 may be generated by the provision control unit 2020. For example, it is assumed that the operation image 20 is an image in which the name of a work target is drawn in a predetermined graphic (for example, a rectangular shape). In this case, the provision control unit 2020 generates the operation image 20 corresponding to a work target by using the name of the work target indicated by work information and the predetermined shape. Note that the predetermined shape may be set in advance in the provision control unit 2020, or may be settable by a user.

<Specific Example of Display Change in Display Screen 50>

A display change in the display screen 50 will be described in detail in the case where the imaging range 132 of the camera 130 is handled as a sensor range. FIG. 9 is a first diagram illustrating a display change in the display screen 50. In this example, the provision start condition is that "a work target is included in the imaging range 132". The provision finish condition is that "a work target is not included in the imaging range". In other words, the operation image 20 corresponding to the work target is displayed on the display screen 50 only while the work target is included in the imaging range 132.

In this example, the camera 130 is provided in the head mounted display 100, and a user changes a direction of the face as represented by an arrow 150. The imaging ranges 132 at time points t1, t2, t3, t4, and t5 are respectively an imaging range 132-1, an imaging range 132-2, an imaging range 132-3, an imaging range 132-4, and an imaging range 132-5.

In this example, work targets indicated by work information are items A, B, and C. Positions of the items are as illustrated in FIG. 9.

At time point t1, none of the items A to C are included in the imaging range 132-1. Thus, the operation images 20 are not displayed on the display screen 50.

At time point t2, the item A is included in the imaging range 132-2. Thus, an operation image 20-1 corresponding to the item A is displayed on the display screen 50.

At time point t3, none of the items A to C are included in the imaging range 132-3. Thus, the operation images 20 are not displayed on the display screen 50.

At time point t4, the items B and C are included in the imaging range 132-4. Thus, an operation image 20-2 corresponding to the item B and an operation image 20-3 corresponding to the item C are displayed on the display screen 50.

At time point t5, none of the items A to C are included in the imaging range 132-5. Thus, the operation images 20 are not displayed on the display screen 50.

Figure 10:
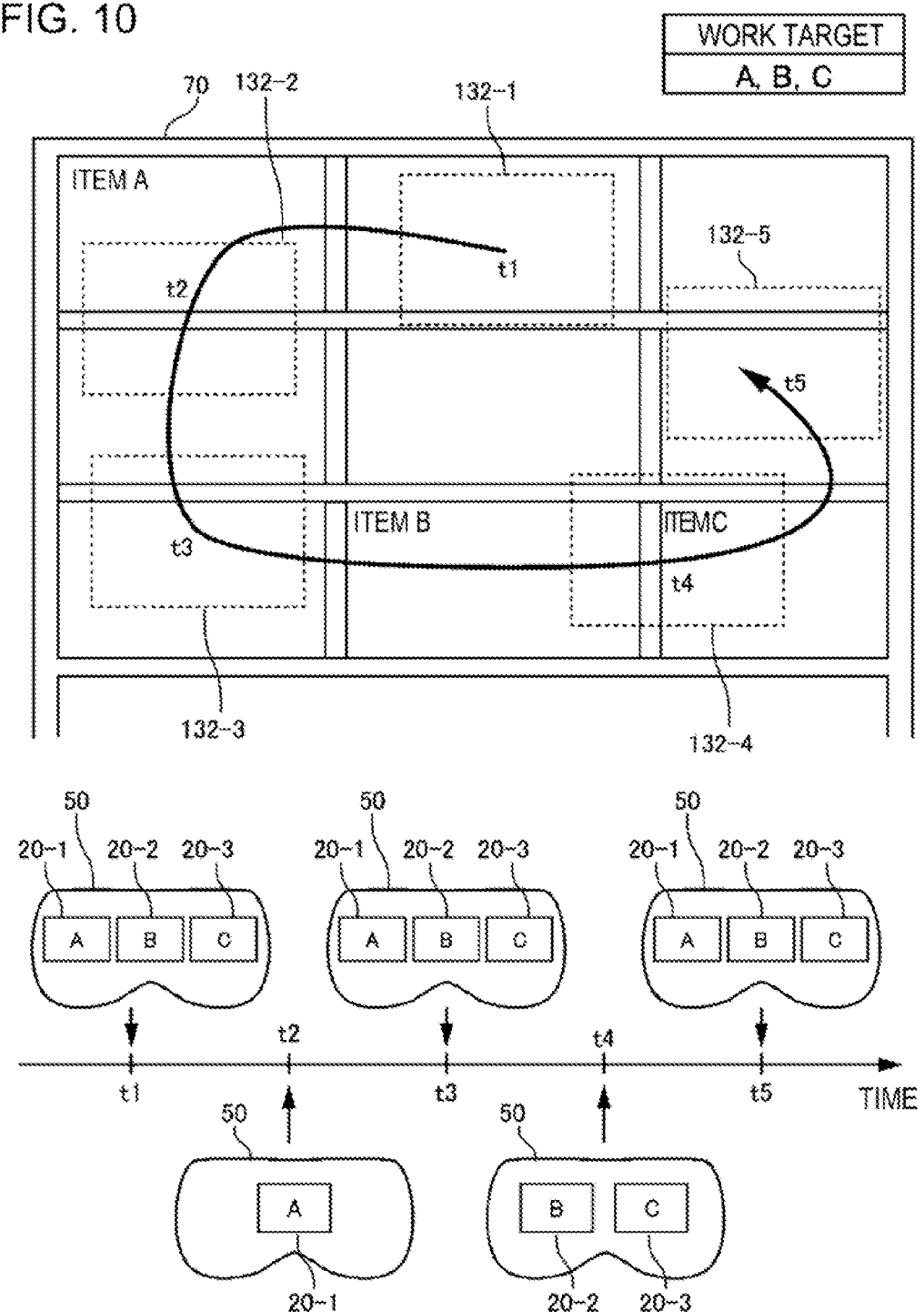
FIG. 10 is a second diagram illustrating a display change in the display screen.

FIG. 10 is a second diagram illustrating a display change in the display screen 50. In this example, the provision start condition is that "no work target is included in the imaging range 132, or a work target is included in the imaging range 132". The provision finish condition is that "a work target is not included in the imaging range 132, and another work target is included in the imaging range 132". Thus, in a situation in which no work target is included in the imaging range 132, the operation images 20 corresponding to all work targets are displayed on the display screen 50. On the other hand, when any work target is included in the imaging range 132, the operation image 20 corresponding to only a work target included in the imaging range 132 is displayed on the display screen 50.

At time point t1, none of the items A to C are included in the imaging range 132-1. Thus, the operation images 20 respectively corresponding to the items A to C are displayed on the display screen 50.

At time point t2, the item A is included in the imaging range 132-2. Thus, only the operation image 20-1 corresponding to the item A is displayed on the display screen 50.

At time point t3, none of the items A to C are included in the imaging range 132-3. Thus, the operation images 20 respectively corresponding to the items A to C are displayed on the display screen 50.

At time point t4, the items B and C are included in the imaging range 132-4. Thus, the operation image 20-2 corresponding to the item B and the operation image 20-3 corresponding to the item C are displayed on the display screen 50.

At time point t5, none of the items A to C are included in the imaging range 132-5. Thus, the operation images 20 respectively corresponding to the items A to C are displayed on the display screen 50.

Figure 11:
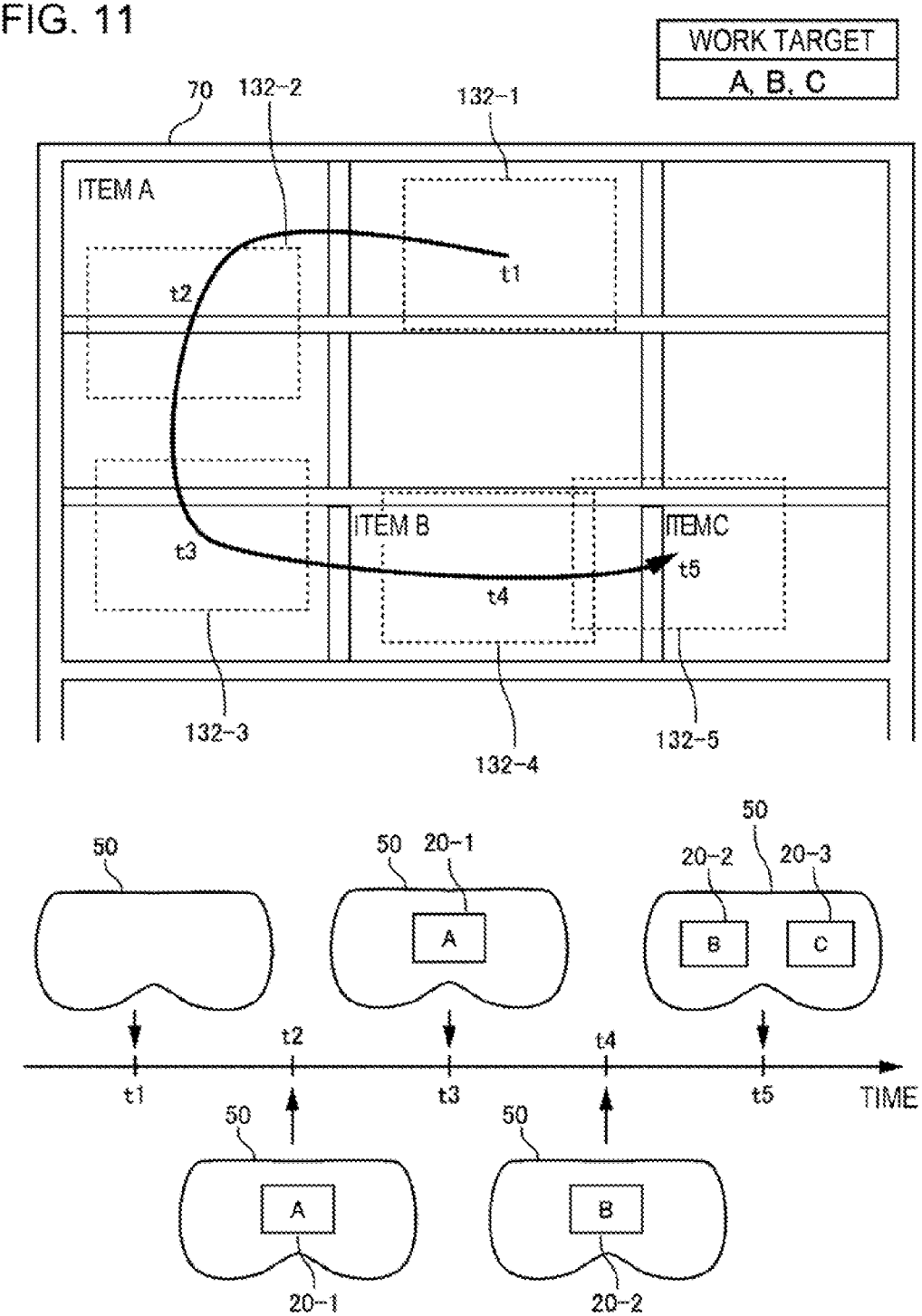
FIG. 11 is a third diagram illustrating a display change in the display screen.

FIG. 11 is a third diagram illustrating a display change in the display screen 50. In this example, the provision start condition is that "a work target is included in the imaging range 132". The provision finish condition is that "a work target is not included in the imaging range, and another work target is included in the imaging range 132". Thus, in a case where a certain work target is included in the imaging range 132, the operation image 20 corresponding to the work target is displayed. Even after the work target becomes not included in the imaging range 132, the operation image 20 keeps displayed until another work target is included in the imaging range 132. Note that, in this example, both of the imaging range 132-4 and the imaging range 132-5 are different from those in FIG. 9 or 10.

In FIG. 11, the display at time point t1 and time point t2 is the same as that in FIG. 9.

At time point t3, the item A is not included in the imaging range 132-3. Neither of the items B and C are included in the imaging range 132-3. Thus, the provision finish condition for the item A is not satisfied. As a result, the operation image 20-1 keeps displayed on the display screen 50.

At time point t4, the item A is not included in the imaging range 132. However, at time point t4, the item B is included in the imaging range 132. This describes a situation in which "the item A is not included in the imaging range 132, and another item B is included in the imaging range 132", and thus the provision finish condition for the item A is satisfied. Thus, on the display screen 50, the operation image 20-1 is not displayed, and the operation image 20-2 corresponding to the item B is displayed.

At time point t5, the item B and the item C are included in the imaging range 132-5. Thus, the operation image 20-2 corresponding to the item B is displayed, and the operation image 20-3 corresponding to the item C is displayed.

<Detection of Input: S110>

The input detection unit 2040 detects an input operation on the operation image 20. For example, as an input operation on the operation image 20, an input operation of specifying one of the operation images 20 displayed on the display screen 50 may be used. Hereinafter, variations of the input operation will be described.

<<Example 1 of Input Operation>>

For example, the input detection unit 2040 detects an input operation using an input device such as a keyboard or a mouse. For example, the input operation is an operation of "moving a cursor of a mouse to the desired operation image 20 and clicking the mouse", or an operation of "using arrow buttons of a keyboard to focus the desired operation image 20 and pressing an enter key". As a specific technique of detecting an input operation using an input device such as a keyboard or a mouse, an existing technique may be used.

Here, it is assumed that the operation image 20 is displayed on a touch panel. In this case, for example, the input detection unit 2040 may detect an input operation (a touch or the like) on the operation image 20 displayed on the touch panel.

Figure 12:
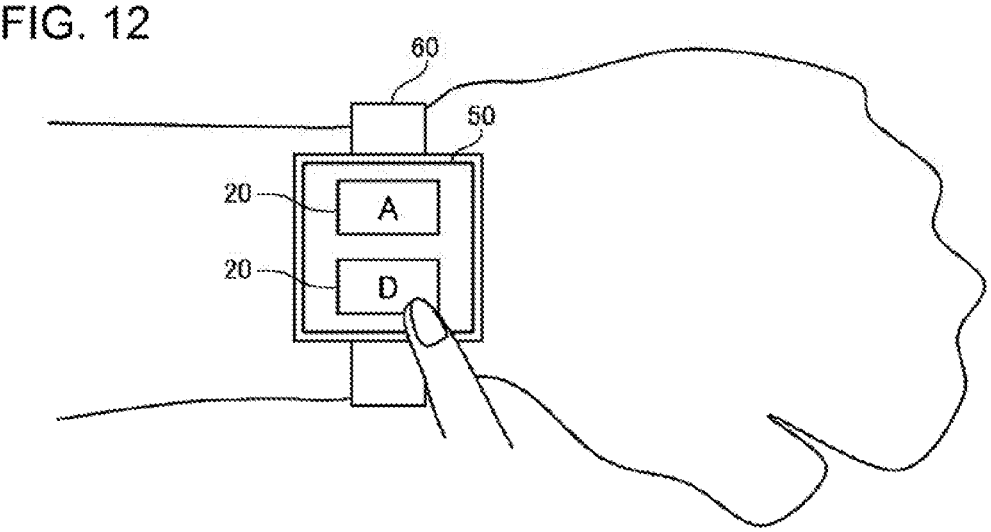
FIG. 12 is a diagram illustrating an input operation performed on an operation image displayed on a watch type device.

FIG. 12 is a diagram illustrating an input operation performed on the operation image 20 displayed on a watch type device attached to a user's arm. In FIG. 12, the display screen 50 is a touch panel provided in a watch type device 60. Two operation images 20 are displayed on the display screen 50. The user touches the operation image 20 and thus performs an input operation on the desired operation image 20.

Note that, in a case where all of the operation images 20 satisfying a provision condition cannot be displayed at the same time on the display screen 50, for example, display of the display screen 50 may be switched by performing a switching operation such as a flick operation on the display screen 50. An existing technique may be employed as a technique of switching images displayed on a display screen to each other in a case where images to be displayed cannot be displayed at the same time as mentioned above. However, the information processing apparatus 2000 can reduce the necessity of a switching operation on the display screen 50 by restricting the operation image 20 displayed on the display screen 50 to the operation image 20 satisfying a provision condition.

In a case where the operation image 20 is displayed on the display screen 50 of the head mounted display 100, an input operation on the operation image 20 may be performed by using the watch type device 60. FIG. 13 is a diagram illustrating an input operation performed by using the watch type device 60 on the operation image 20 displayed on the display screen 50 of the head mounted display 100.

In FIG. 13, three operation images 20 are displayed on the display screen 50 of the head mounted display 100. A user focuses any one of the operation images 20 so as to select the operation image 20, and performs an input operation to finalize the selection. Here, finalizing the selection of the operation image 20 means performing an input operation to specify the operation image 20 being selected, such as an input operation of pressing an enter key while the operation image 20 having focus.

Focus switching is performed by touching arrow buttons 62 displayed on a display screen of the watch type device 60. Input of finalizing selection is performed by touching an OK button 63 displayed on the display screen of the watch type device 60.

In the example illustrated in FIG. 13, the focused operation image 20 is the operation image 20-1 painted with a dot pattern. Thus, when the OK button 63 is touched in this state, input of selecting the item A is finalized. The arrow buttons 62 are touched, and thus the focused operation image 20 can be changed to the operation image 20-2 or the operation image 20-3.

<<Example 2 of Input Operation>>

For example, the input detection unit 2040 may detect a user's input operation by using the captured image 134 generated by the camera 130. The display screen 50 is assumed to be provided in the head mounted display 100. A user can view the operation image 20 and a finger or the like (hereinafter, an operation body) for performing an input operation on the operation image 20 through the display screen 50.

For example, the user performs an operation of overlapping the operation body on the operation image 20 that is visible through the display screen 50. This operation is imaged by the camera 130. The input detection unit 2040 performs image analysis on the captured image 134 including the operation and thus detects an input operation performed on the operation image 20 by the user. The technique disclosed in, for example, Patent Document 4 may be used as a technique of detecting a user's input operation on an operation image by imaging the user's operation on the operation image displayed on a display screen of a head mounted display with a camera as mentioned above.

Figure 14:
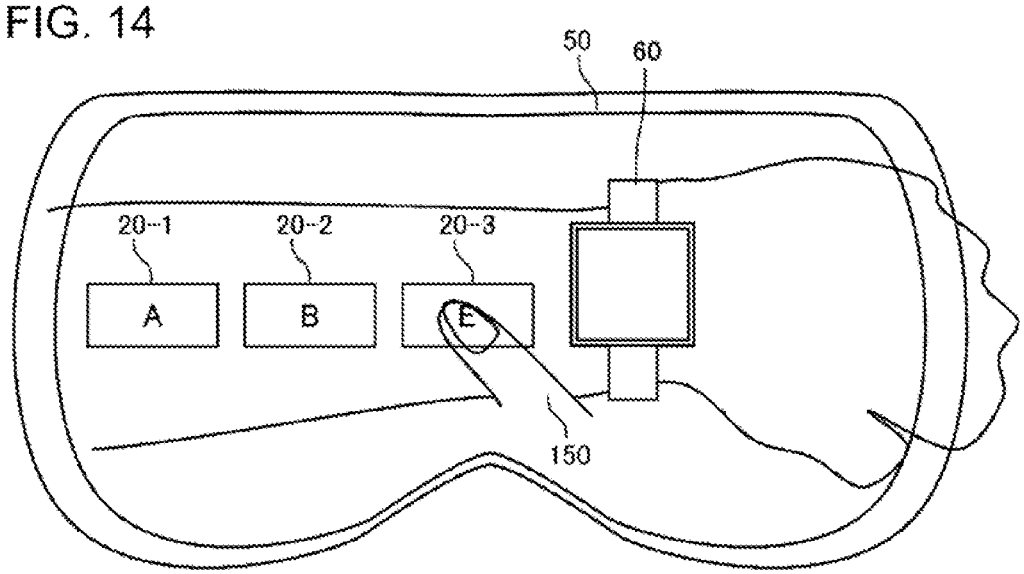
FIG. 14 is a diagram illustrating a user operation performed by using an operation body.

FIG. 14 is a diagram illustrating a user operation performed by using an operation body. In FIG. 14, a finger 150 is located at a position overlapping the operation image 20-3. Thus, an input operation on the operation image 20-3 is detected. The input operation is detected, for example, when vibration is applied to the user's arm or overlapping of the operation body on the identical operation image 20 continues for a predetermined time or more. A specific method therefor is disclosed in, for example, Patent Document 4 described above.

Note that, as disclosed in Patent Document 4, the provision control unit 2020 may display an image (the operation image 20 in the present example embodiment) that is to be a target of an input operation so as to overlap a predetermined part of a human, such as an arm. In this case, the provision control unit 2020 may display the operation image 20 satisfying a provision condition on the display screen 50 only when a predetermined part of a human is included in an imaging range of the camera 130 (the predetermined part of the human is detected from the captured image 134).

<<Example 3 of Input Operation>>

Figure 15:
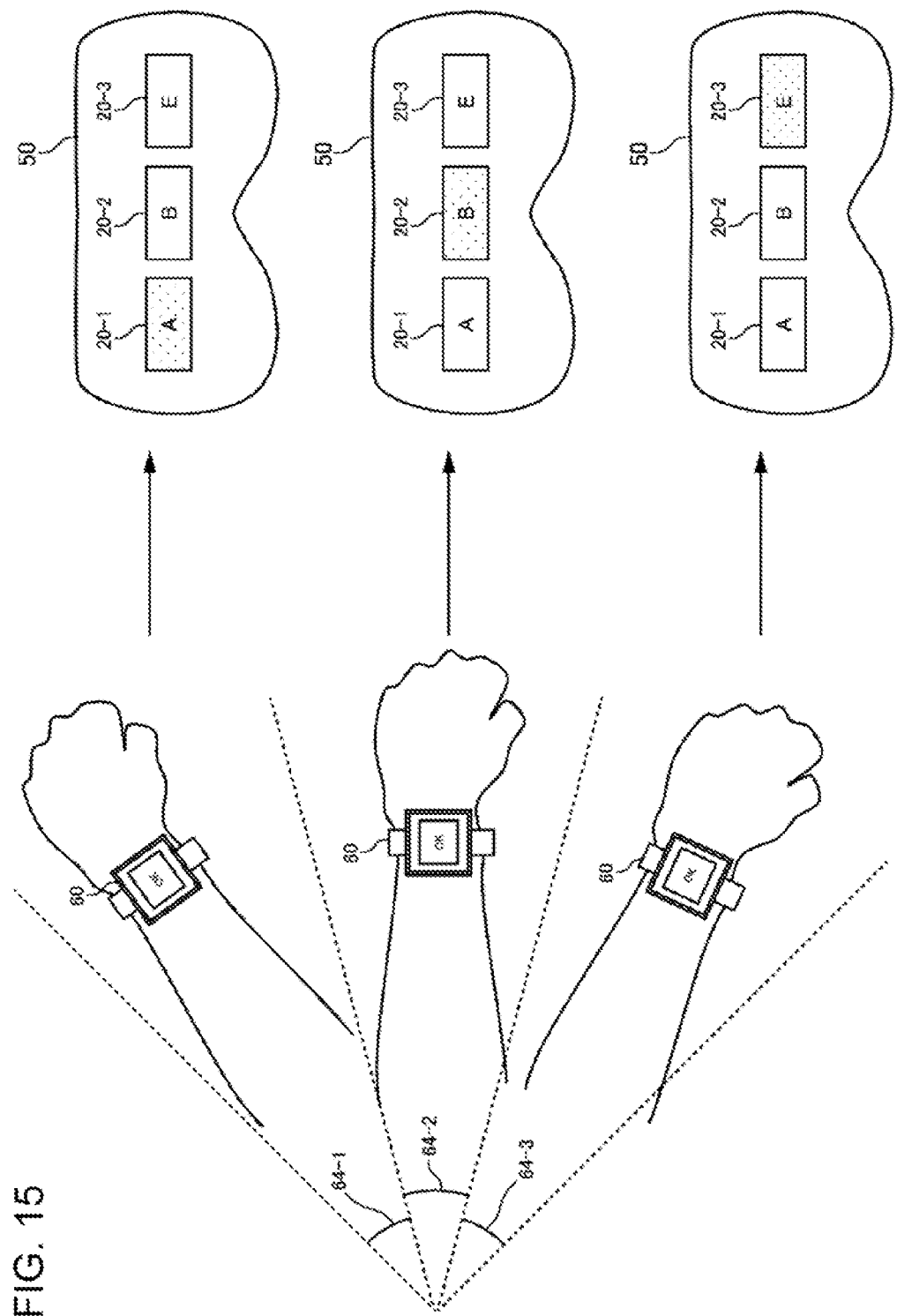
FIG. 15 is a diagram illustrating an input operation performed by inclining the watch type device.

For example, an input operation on the operation image 20 may be performed by using a pose of a device worn by a user, such as the watch type device 60. FIG. 15 is a diagram illustrating an input operation performed by inclining the watch type device 60. In FIG. 15, the display screen 50 is a display screen provided in the head mounted display 100. Three operation images 20 are displayed on the display screen 50.

A user changes a pose of the watch type device 60 by changing an inclination of the arm mounted with the watch type device 60. In the above-described way, the user brings the desired operation image 20 into a selected state. In FIG. 15, when an inclination of the arm is within a range 64-1, the operation image 20-1 is brought into a selected state. When an inclination of the arm is within a range 64-2, the operation image 20-2 is brought into a selected state. When an inclination of the arm is within a range 64-3, the operation image 20-3 is brought into a selected state. Note that a background color of the operation image 20 in a selected state is changed to a dot pattern. Here, an inclination of the watch type device 60 may be recognized by using, for example, an acceleration sensor provided in the watch type device 60.

Thereafter, the user finalizes selection of the operation image 20. There are various methods of finalizing selection of the operation image 20. For example, in a case where a state in which any one of the operation images 20 is selected continues for a predetermined time, the input detection unit 2040 finalizes selection of the operation image 20. In another example, in a case where a predetermined operation for finalizing selection is performed in a state in which any one of the operation images 20 is selected, the input detection unit 2040 finalizes the selection. In another example, the predetermined operation is an operation (for example, an operation of pressing the OK button in FIG. 15) of touching the touch panel of the watch type device 60, an operation of applying vibration to the arm, or an operation of touching the arm. Note that the operation of applying vibration to the arm or the operation of touching the arm may be detected by using various sensors. For example, the operation of applying vibration to the arm may be detected by using a vibration sensor. The operation of touching the arm may be detected by using an electrostatic capacitance sensor or a pressure sensor. Such a sensor is provided in, for example, the watch type device 60. However, the sensor may be provided in devices other than the watch type device 60.

Here, it may be considered that an input operation of selecting the operation image 20 by inclining the watch type device 60 becomes easier as the number of ranges 64 becomes smaller. For example, in a case where the entire range of moving the arm is fixed regardless of the number of operation images 20, a size of each range 64 is reduced if the number of operation images 20 increases. Thus, in a case where the number of ranges 64 is large, the selected operation image 20 is changed just by slightly inclining the arm, and thus a user is required to finely control a position of the arm. Therefore, the number of ranges 64 is preferably small.

In a case where a size of each range 64 is fixed regardless of the number of operation images 20, the entire range of moving the arm is increased as the number of operation images 20 is increased. Thus, since the entire range of moving the arm is increased in a case where the number of ranges 64 is large, a user is required to largely move the arm in order to perform an input operation. Therefore, even in a case where a size of the range 64 is fixed, the number of ranges 64 is preferably small.

According to the information processing apparatus 2000 of the present example embodiment, the operation image 20 provided on the display screen 50 by the provision control unit 2020 is narrowed down, and thus it is possible to relatively reduce the number of ranges 64. Therefore, it is possible to further facilitate a user's input operation performed by inclining the watch type device 60.

<<Example 4 of Input Operation>>

For example, an input operation on the operation image 20 may be voice input. For example, a user speaks a word (for example, the name of a work target corresponding to the operation image 20) corresponding to any one of the operation images 20. The input detection unit 2040 performs a voice analysis process on the user's speaking, and thus determines an input operation on which operation image 20. Here, a word corresponding to each selection target is indicated by, for example, target information in advance.

Note that, as a technique of selecting one or more options with voice input, an existing technique may be used.

Here, an operation using a position of the watch type device 60 may be used as an operation of selecting the operation image 20, and voice input may be used as an operation of finalizing selection. For example, a user selects the desired operation image 20 by inclining the arm, and then utters a predetermined voice such as "OK" so as to finalize the selection.

<Default Focus>

As described above, as an input operation on the operation image 20, there is an operation that "the desired operation image 20 is selected (focused), and then the selection is finalized". In this operation, when a plurality of operation images 20 are displayed on the display screen 50, any one of the operation images 20 may be focused by default. In this case, there are various methods of defining which operation image 20 is focused.

For example, in a case where the operation image 20 corresponding to a work target included in a sensor range is displayed on the display screen 50, the provision control unit 2020 determines a work target located at a position closest to a predetermined position (for example, a central position) in the sensor range. The provision control unit 2020 focuses the operation image 20 corresponding to the determined work target by default.

For example, in a case where the imaging range 132 of the camera 130 is used as a sensor range, there is a high probability that, as a work target is located at a position closer to the center of the imaging range 132, the work target is located at a position closer to the center of a user's view. Thus, there is a high probability that, a user pays more attention to a work target as the work target is located at a position closer to the center of the imaging range 132. Thus, by giving the focus to the operation image 20 corresponding to a work target located at a position closest to a predetermined position in a sensor range, it is able to make it a default state where the operation image 20 corresponding to a work target to which a user pays attention with the highest probability has the focus. Therefore, it is possible to increase a probability that the operation image 20 desired by a user has the focus from the beginning, that is, a probability that the user may not be required to perform an operation of selecting the operation image 20, thereby being able to increase the efficiency of work of the user.

In another example, the provision control unit 2020 may determine the operation image 20 having the focus by default on the basis of disposition of the operation images 20 on the display screen 50. For example, the provision control unit 2020 focuses the operation image 20 disposed at a predetermined position such a center or an end by default.

Modification Examples

In the example embodiment, a work target satisfying a provision condition is visually provided such that the corresponding operation image 20 is displayed on the display screen 50. However, provision of a work target satisfying a provision condition may be auditory provision using a voice. As mentioned above, provision using a voice is performed.

In this case, the provision control unit 2020 outputs a voice representing a work target satisfying a provision condition from a voice output device (a speaker or the like). The voice representing a work target is, for example, the number of the work target. The voice is assumed to be indicated by work information in advance.

The provision control unit 2020 may perform both of visual provision using the operation image 20 and auditory provision using a voice.

Here, in a case where provision of a work target is performed by using only a voice, for example, the input detection unit 2040 receives an input operation using voice input. For example, the input detection unit 2040 may perform an input operation through an operation of inclining the watch type device 60. In this case, the information processing apparatus 2000 preferably provides, with a voice, which work target is selected through an operation of inclining the watch type device 60.

Example Embodiment 2

Figure 16:
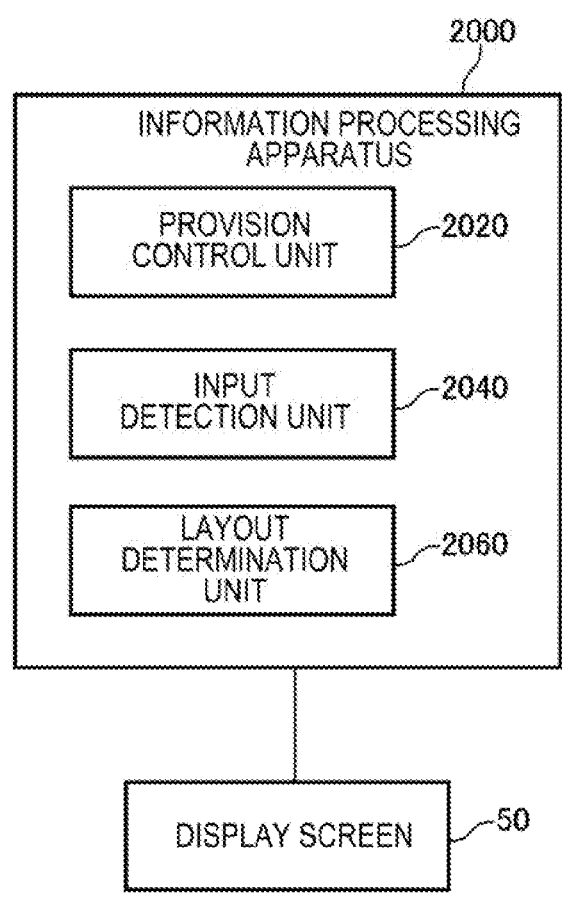
FIG. 16 is a block diagram illustrating a functional configuration of an information processing apparatus of Example Embodiment 2.

FIG. 16 is a block diagram illustrating a functional configuration of an information processing apparatus 2000 of Example Embodiment 2. The information processing apparatus 2000 of Example Embodiment 2 has the same functions as those of the information processing apparatus 2000 of Example Embodiment 1 except for contents described below.

The information processing apparatus 2000 of Example Embodiment 2 has a layout determination unit 2060. The layout determination unit 2060 determines a layout of the operation images 20 in the display screen 50. The provision control unit 2020 displays the operation images 20 on the display screen 50 according to the layout determined by the layout determination unit 2060.

Various layouts may be determined by the layout determination unit 2060. Hereinafter, specific examples thereof will be described.

For example, the layout determination unit 2060 determines a size and a position of the operation image 20 according to the number of operation images 20 to be displayed on the display screen 50. For example, the layout determination unit 2060 equally allocates the operation images 20 to an area in which the operation images 20 are displayed. Specifically, the layout determination unit 2060 equally divides the area into parts corresponding to the number of operation images 20, and thus generates a plurality of partial areas. The layout determination unit 2060 allocates the operation image 20 to each partial area.

FIG. 17 is a diagram illustrating that a layout of the operation images 20 is determined according to the number of operation images 20. In FIG. 17, an area in which the operation images 20 are displayed is an area 90. The area 90 is divided into a plurality of partial areas 92. When the number of operation images 20 to be displayed on the display screen 50 is indicated by n, the layout determination unit 2060 equally divides the area 90 into n parts, and thus generates n partial areas 92.

In the example illustrated on the upper part in FIG. 17, a direction of dividing the area 90 is a horizontal direction, and the number of operation images 20 is five. Thus, five partial areas 92 are generated in the horizontal direction, and the operation image 20 is allocated to each partial area 92. On the other hand, in the example illustrated on the lower patient in FIG. 17, a direction of dividing the area 90 is a vertical direction, and the number of operation images 20 is three. Thus, the area 90 is equally divided into three parts in the horizontal direction, and the operation image 20 is allocated to each partial area 92.

Note that disposition of the operation images 20 in the area 90 is not limited to a column or a row. For example, various dispositions such as a lattice form may be used.

<Association Between Operation Image 20 and Partial Area 92>

There are various methods of determining to which partial area 92 each operation image 20 is allocated, that is, an association between the partial area 92 and the operation image 20. For example, the layout determination unit 2060 assigns a rank to each of the operation image 20 and the partial area 92 according to a predetermined rule. The layout determination unit 2060 associates the operation image 20 and the partial area 92 having the same rank with each other.

For example, the partial area 92 at a position where a user more easily operates or views is assigned with a higher rank. Here, there are various specific rules for assigning a rank to the partial area 92. FIG. 18 is a diagram illustrating a rule in which ranks are assigned to the partial areas 92 generated by dividing the area 90 in a row. In FIG. 18, a number written in the partial area 92 represents a rank assigned to the partial area 92. Hereinafter, a number representing a rank being small is expressed as "a rank being high".

In the example illustrated on the upper part in FIG. 18, as the partial area 92 is located at more left position, its ranks becomes higher. On the other hand, in the example illustrated on the lower part in FIG. 18, as the partial area 92 is located at more central position, its rank becomes higher.

For example, as described in "Example 2 of input operation" of Example Embodiment 1, it is assumed that an input operation using the technique disclosed in Patent Document 4 is detected (refer to FIG. 14). In this case, as the partial area 92 becomes closer to the watch type device 60, a rank of the partial area 92 may become higher. In the above-described way, for example, in a case where a vibration sensor is provided in the watch type device 60, vibration or the like occurring when the operation image 20 is operated is easily detected, and thus the accuracy of detection of an input operation is improved.

The rule in which a rank is assigned to the partial area 92 may be fixedly set in the layout determination unit 2060, or may be settable by a user.

The layout determination unit 2060 also assigns a rank to the operation image 20. For example, the layout determination unit 2060 preferably determines a rank of the operation image 20 such that the rank becomes higher as the operation image 20 is highly likely to be subjected to an input operation by a user.

There are various rules in which a rank is assigned to the operation image 20. For example, the layout determination unit 2060 assigns a higher rank to the operation image 20 as the operation image corresponds to a work target closer to a predetermined position (for example, a central position) in the sensor range. Here, as a work target becomes closer to the center of the sensor range, the work target is more likely to be located at the center of a user's view, and thus it may be considered that the user is highly likely to pay attention to the work target. Therefore, it may be considered that, as the operation image 20 corresponds to a work target closer to the center of the sensor range, the operation image is highly likely to be subjected to an input operation by the user. Therefore, a rank of the operation image 20 corresponding to a work target close to the center of a sensor range is made high, and thus a rank of the operation image 20 that is highly likely to be subjected to an input operation by a user can be made high.

In another example, the layout determination unit 2060 makes a rank higher as a time point of satisfying a provision start condition becomes later (the rank is in a descending order of the time point). In the above-described way, a rank of the new operation image 20 that is displayed on the display screen 50 is higher than a rank of the operation image 20 that has been already displayed on the display screen 50.

In another example, the layout determination unit 2060 may make a rank higher as a time point of satisfying a provision start condition becomes earlier (the rank is in an ascending order of the time point). In the above-described way, as a time of the operation image 20 displayed on the display screen 50 is increased, a rank thereof becomes higher.

In another example, the layout determination unit 2060 may determine a rank of the operation image 20 by using work information. For example, it is assumed that a priority of each work target is indicated by work information. In this case, the layout determination unit 2060 makes a rank of the operation image 20 higher as a priority of a corresponding work target becomes higher. In another example, it is assumed that an order of work is indicated by work information. For example, it is assumed that an order of taking out items is indicated by work information, such as "taking out in an order of the items A, C, and D". In this case, the layout determination unit 2060 determines ranks of the operation images 20 in a work order of corresponding work targets. As mentioned above, the operation image 20 can be displayed in a rank intended by a user by using a priority or a work rank indicated by work information.

<Variations of Method of Dividing Area 90>

A method of dividing the area 90 is not limited to the method of equally dividing the area into parts corresponding to the number of operation images 20 as described above. For example, the area 90 may be divided in a fixed manner in advance regardless of the number of operation images 20. In this case, in a case where the number of operation images 20 is smaller than the number of partial areas 92, there are some partial areas 92 in which the operation image 20 is not displayed. On the other hand, in a case where the number of operation images 20 is larger than the number of partial areas 92, some operation images 20 are not displayed on the display screen 50.

FIG. 19 is a diagram illustrating the area 90 that is divided in a fixed manner in advance. In FIG. 19, the area 90 is divided into three parts in advance in the horizontal direction. In the example illustrated on the upper part in FIG. 19, there is the single operation image 20 satisfying a provision condition. Thus, the operation image 20 is displayed in only the single partial area 92 among the three partial areas 92.

In the example illustrated on the lower part in FIG. 19, there is the five operation images 20 satisfying a provision condition. Thus, among the five operation images 20, two operation images 20 cannot be displayed on the display screen 50. In this case, a user changes the operation image 20 (the operation image 20 allocated to the partial area 92) displayed on the display screen 50 by performing, for example, a predetermined operation. For example, in this example, arrows 22 are displayed on the display screen 50. The user changes the operation image 20 displayed on the display screen 50 by performing an input operation on the arrows 22. Note that, as a method of changing display by using an arrow button or the like in a case where all images cannot be displayed on the display screen 50, an existing technique may be used.

Note that, as in the example illustrated on the upper part in FIG. 19, in a case where the operation images 20 are not displayed in some of the partial areas 92, for example, the provision control unit 2020 uses the partial areas 92 in a descending order of the rank.

The area 90 may not be equally divided. In other words, the layout determination unit 2060 may set sizes of the partial areas 92 to be different from each other. Specifically, the layout determination unit 2060 determines a size of the partial area 92 on the basis of a predetermined criterion. For example, the layout determination unit 2060 set a larger size to the partial area 92 with higher rank. In the above-described way, as a rank of the operation image 20 becomes higher, the operation image is displayed larger. Consequently, as the operation image 20 is highly likely to be subjected to a target that is an input operation by a user, a size of the operation image 20 can be increased, and thus it is possible to improve the efficiency of work of the user.

Figure 20:
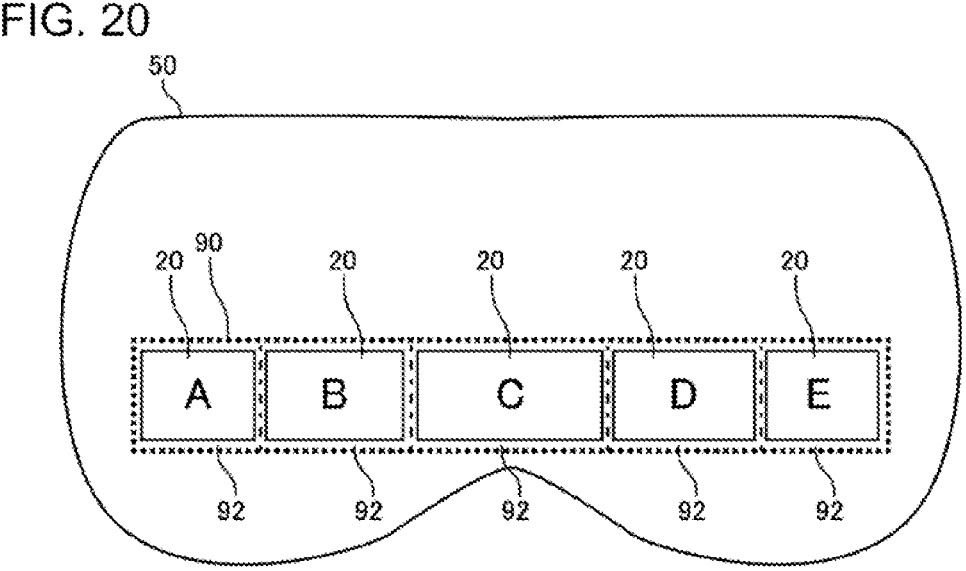
FIG. 20 is a first diagram illustrating partial areas having different sizes.

FIG. 20 is a first diagram illustrating the partial areas 92 having different sizes. In FIG. 20, as the partial area 92 becomes closer to the center, a size thereof becomes larger.

However, the layout determination unit 2060 is not required to make sizes of all of the partial areas 92 different from each other. For example, the layout determination unit 2060 makes only a size of the partial area 92 having the highest rank larger, and makes sizes of the other partial areas 92 the same as each other.

Figure 21:
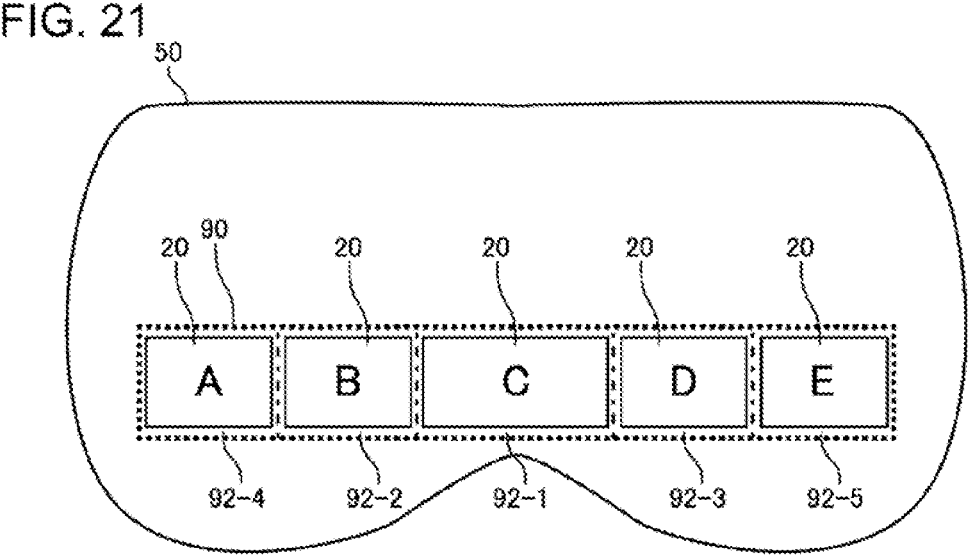
FIG. 21 is a second diagram illustrating partial areas having different sizes.

FIG. 21 is a second diagram illustrating the partial areas 92 having different sizes. In FIG. 20, a size of the partial area 92-1 closest to the center is larger than sizes of the other partial areas 92. However, sizes the partial area 92-2 to the partial area 92-5 are the same as each other.

<Hardware Configuration Example>

A hardware configuration of a computer realizing the information processing apparatus 2000 of Example Embodiment 2 is represented in, for example, FIG. 3 in the same manner as in Example Embodiment 1. However, a program module realizing the functions of the information processing apparatus 2000 of the present example embodiment is further stored in the storage device 1080 of the computer 1000 realizing the information processing apparatus 2000 of the present example embodiment.

Modification Examples

As described above, the information processing apparatus 2000 may provide a work target satisfying a provision condition with a voice. In this case, preferably, the provision control unit 2020 determines a rank of a work target according to the method, and controls a voice by using the rank.

For example, the provision control unit 2020 determines ranks of work targets satisfying a provision condition, and provides voices representing the work targets in an order of the ranks. For example, in a case where a rank such as "the item A, the item E, and the item B" is determined, the provision control unit 2020 performs provision in an order of a voice representing the item A, a voice representing the item E, and a voice representing the item B.

The input detection unit 2040 may define a sensitivity of an input operation on a work target on the basis of a rank of the work target. Specifically, the input detection unit 2040 detects even a weak voice as input with respect to voice input for selecting a work target having a high rank, but does not detect a weak voice as input with respect to voice input for selecting a work target having a low rank. In the above-described way, as to an input operation on a work target with a high probability of being selected by a user, even a weak voice is detected as an input operation. On the other hand, as to an input operation on a work target with a low probability of being selected by a user, a weak voice is not detected as an input operation. Therefore, it is possible to prevent wrong detection of an input operation while facilitating a user's input operation.

A more specific method is as follows, for example. First, as a threshold value of a sound pressure, a first threshold value and a second threshold value (the first threshold value<the second threshold value) are defined. With respect to a voice for selecting a work target whose rank is equal to or higher than a predetermined rank, the input detection unit 2040 detects the voice as an input operation in a case where a sound pressure thereof is equal to or more than the first threshold value, and does not detect the voice as an input operation in a case where the sound pressure thereof is less than the first threshold value. On the other hand, with respect to a voice for selecting a work target whose rank is lower than the predetermined rank, the input detection unit 2040 detects the voice as an input operation in a case where a sound pressure thereof is equal to or more than the second threshold value, and does not detect the voice as an input operation in a case where the sound pressure thereof is less than the second threshold value. In other words, a voice for selecting a work target whose rank is lower than a predetermined rank is not detected as an input operation in a case where a sound pressure thereof is less than the second threshold value even through the sound pressure is equal to or more than the first threshold value.

Example Embodiment 3

Figure 22:
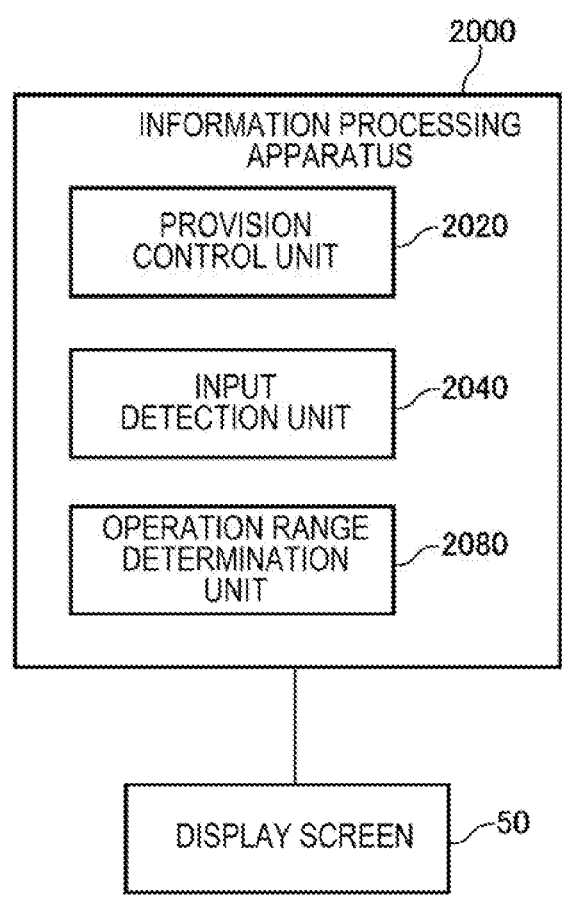
FIG. 22 is a block diagram illustrating a functional configuration of an information processing apparatus of Example Embodiment 3.

FIG. 22 is a block diagram illustrating a functional configuration of an information processing apparatus 2000 of Example Embodiment 3. The information processing apparatus 2000 of Example Embodiment 3 has the same functions as those of the information processing apparatus 2000 of Example Embodiment 1 or Example Embodiment 2 except for contents described below.

In the present example embodiment, an input operation detected by the input detection unit 2040 is assumed to be an input operation (refer to FIG. 15) using an inclination of the watch type device 60. The information processing apparatus 2000 of Example Embodiment 3 has an operation range determination unit 2080. The operation range determination unit 2080 divides the entire range of an inclination of the watch type device 60 used to select the operation image 20 into partial ranges, and allocates the partial range to each operation image 20 (the range 64-1 to the range 64-3 in FIG. 15). For example, this process is a process for the same purpose as that of the process described in Example Embodiment 2 in which the area 90 is divided into the partial areas 92 to be allocated to the respective operation images 20.

Figure 23:
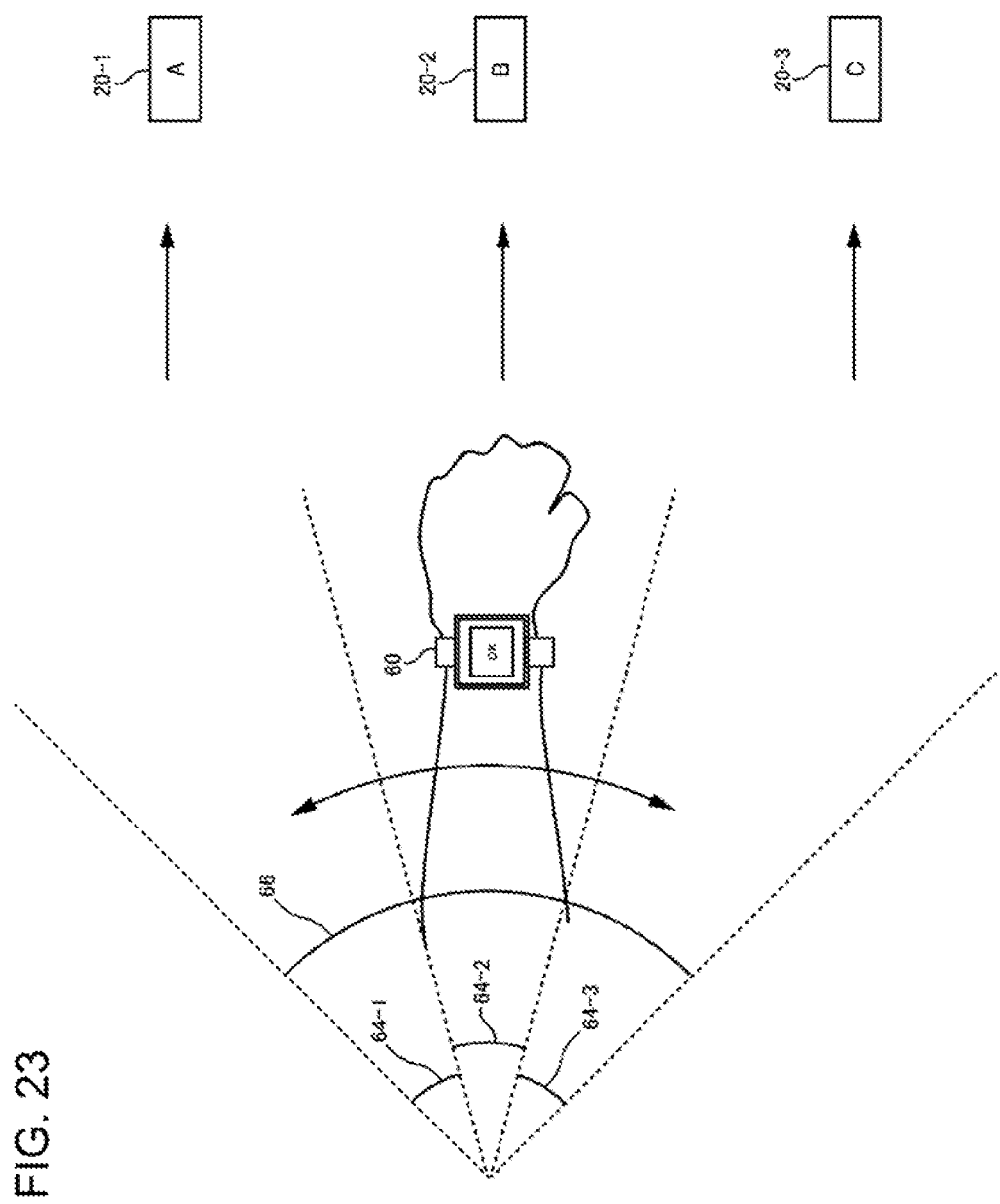
FIG. 23 is a diagram illustrating an operation range determined by an operation range determination unit.

FIG. 23 is a diagram illustrating an operation range determined by the operation range determination unit 2080. The operation range determination unit 2080 divides the entire range 66 into a plurality of ranges 64. The operation range determination unit 2080 allocates the operation image 20 to each range 64. In a case where the watch type device 60 is inclined to be included in a certain range 64, the operation image 20 corresponding to the range 64 turns into a state of being selected.

For example, the operation range determination unit 2080 equally divides the entire range 66 into the ranges 64 corresponding to the number of operation images 20 to be displayed on the display screen 50. Sizes of the ranges 64 corresponding to the respective operation images 20 are the same as each other.

Figure 24:
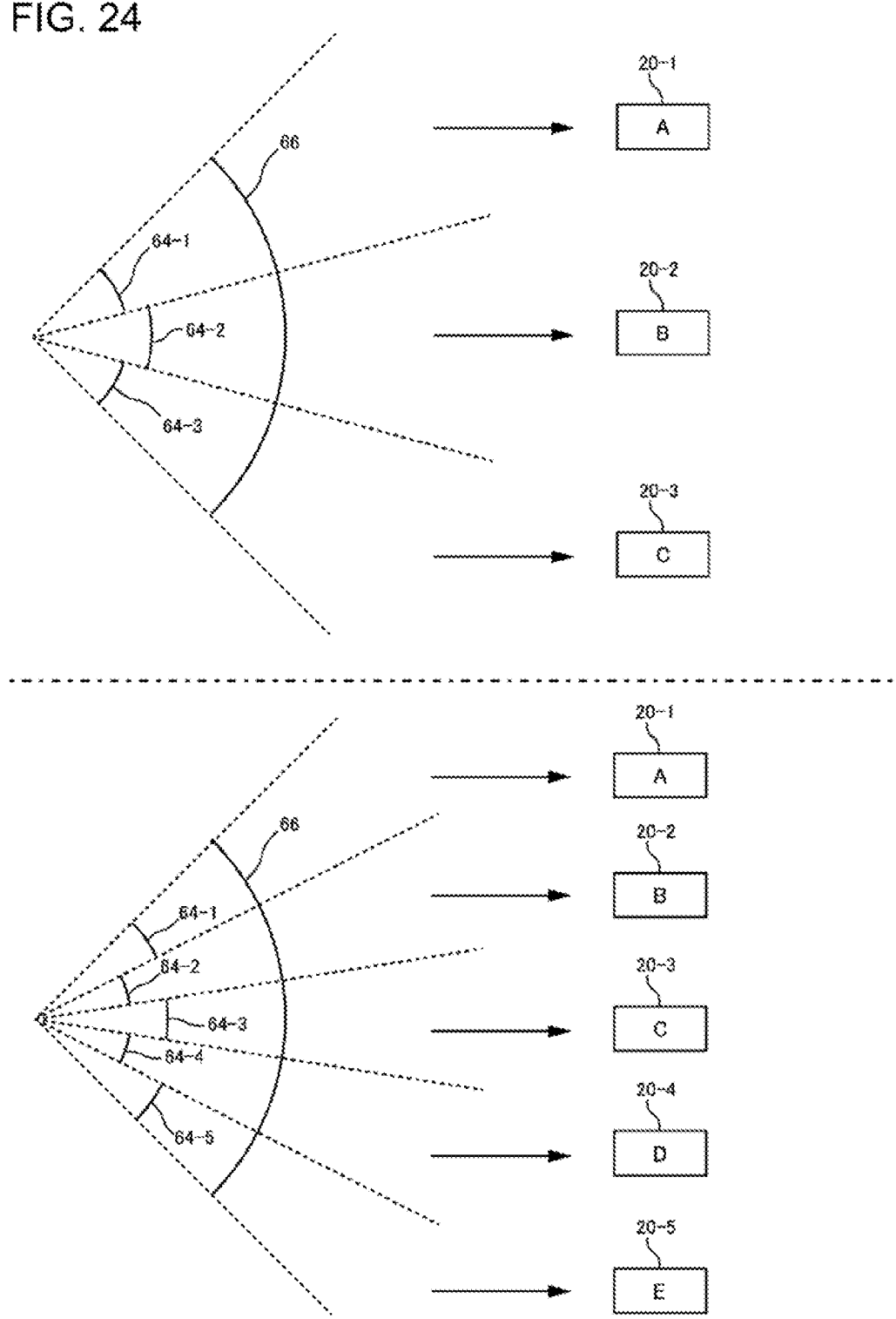
FIG. 24 is a diagram illustrating a case where a size of a range is determined according to the number of operation images.

FIG. 24 is a diagram illustrating a case where a size of the range 64 is determined according to the number of operation images 20. In the example illustrated on the upper part in FIG. 24, the number of operation images 20 satisfying a provision condition is three. Thus, the entire range 66 is divided into three ranges. On the other hand, in the example illustrated on the lower part in FIG. 24, the number of operation images 20 satisfying a provision condition is five. Thus, the entire range 66 is divided into five ranges.

<Association Between Range 64 and Operation Image 20>

Association between the range 64 and the operation image 20 may be realized in the same manner as the association between the partial area 92 and the operation image 20, described in Example Embodiment 2. For example, a rank of each of the range 64 and the operation image 20 is determined, and the range 64 and the operation image 20 having the same rank are associated with each other. Ranking of the operation image 20 is performed such that, for example, a higher rank is assigned to the operation image 20 corresponding to a work target closer to a predetermined position in a sensor range.

A rank of the range 64 preferably becomes higher as the display screen 62 allows a user to take a more comfortable pose. For example, a rank of the range 64 becomes higher as the range comes closer to the center of the entire range 66. A method of determining a rank of the operation image 20 is the same as the method described in Example Embodiment 2.

Here, in a case where the layout determination unit 2060 is provided in the present example embodiment, the layout determination unit 2060 preferably determines a layout of the operation images 20 in the display screen 50 on the basis of an association between the operation image 20 and the range 64. In the above-described way, a user can select the desired operation image 20 by inclining the watch type device 60 while referring to a positional relationship among the operation images 20 displayed on the display screen 50.

FIG. 25 is a diagram illustrating a case where a layout of the operation images 20 is determined on the basis of an association between the operation image 20 and the range 64. In FIG. 25, operation images 20 associated with the ranges 64 are the operation image 20-1, the operation image 20-2, and the operation image 20-3 in order from the top. Thus, the layout determination unit 2060 divides the area 90 into three parts in a column, and allocates the operation image 20-1, the operation image 20-2, and the operation image 20-3 to the divided areas in order from the top.

A user viewing the display screen 50 in FIG. 25 can intuitively recognize that the operation image 20-1 is selected when the arm is inclined upward, the operation image 20-2 is selected when the arm is not inclined, and the operation image 20-3 is selected when the arm is inclined downward. Thus, an input operation is facilitated for the user, and thus the efficiency of work of the user is improved.

Note that sizes of the ranges 64 may be the same as each other, or may be different from each other. A method of making sizes of the ranges 64 different from each other is the same as the method (refer to Example Embodiment 2) of making sizes of the partial areas 92 different from each other. For example, the operation range determination unit 2080 increases a size of the range 64 having a higher rank.

<Hardware Configuration Example>

A hardware configuration of a computer realizing the information processing apparatus 2000 of Example Embodiment 3 is represented in, for example, FIG. 3 in the same manner as in Example Embodiment 1. However, a program module realizing the functions of the information processing apparatus 2000 of the present example embodiment is further stored in the storage device 1080 of the computer 1000 realizing the information processing apparatus 2000 of the present example embodiment.

Example Embodiment 4

Figure 26:
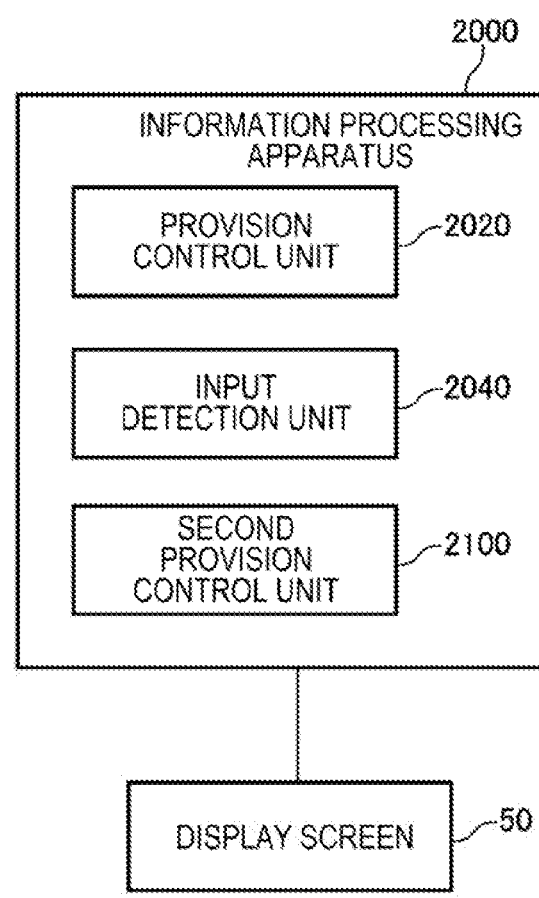
FIG. 26 is a block diagram illustrating a functional configuration of an information processing apparatus of Example Embodiment 4.

FIG. 26 is a block diagram illustrating a functional configuration of an information processing apparatus 2000 of Example Embodiment 4. The information processing apparatus 2000 of Example Embodiment 4 has the same functions as those of the information processing apparatus 2000 any of Example Embodiment 1 to Example Embodiment 3 except for contents described below.

The information processing apparatus 2000 of Example Embodiment 4 has a second provision control unit 2100. The second provision control unit 2100 displays, on the display screen 50, a guide for displaying the operation image 20 corresponding to a work target on the display screen 50 with respect to the work target to which the corresponding operation image 20 is not displayed on the display screen 50.

Figure 27:
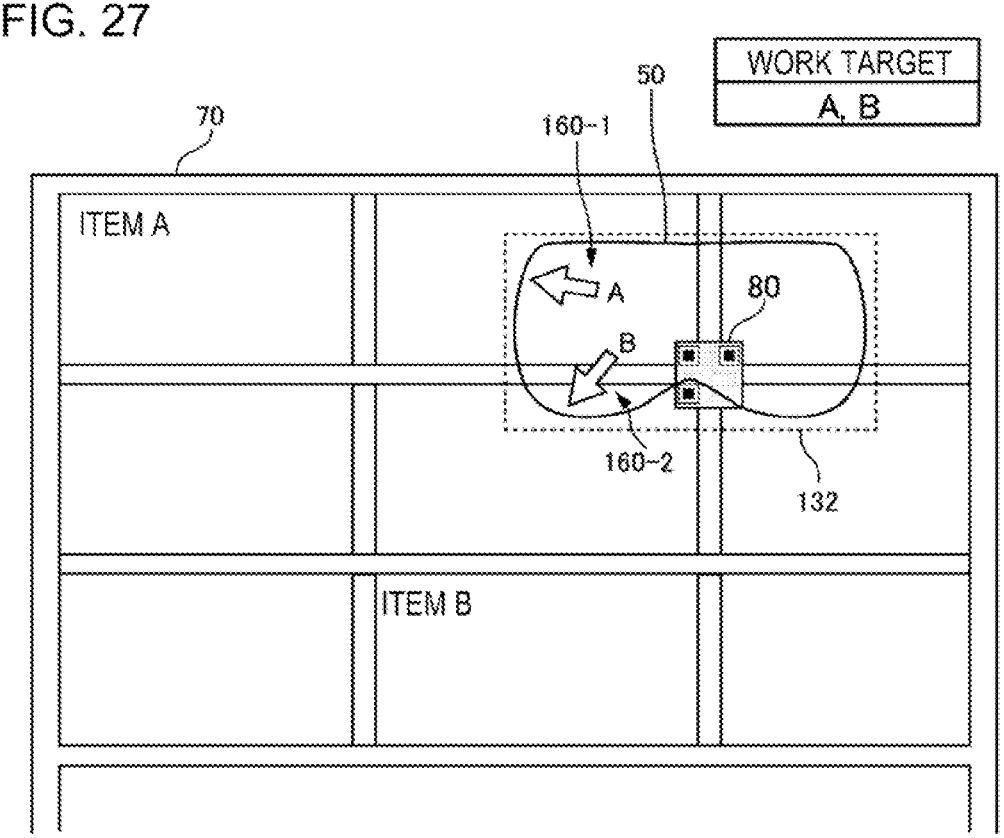
FIG. 27 is a diagram illustrating a guide displayed on a display screen.

FIG. 27 is a diagram illustrating a guide displayed on the display screen 50. In FIG. 27, a guide 160-1 is a guide indicating a direction in which the item A is located. On the other hand, a guide 160-2 is a guide indicating a direction in which the item B is located.

A direction of an arrow of the guide 160 representing a direction directed toward a work target is represented as, for example, a direction directed from the center of the imaging range 132 toward a position of the work target. However, a direction of the arrow of the guide 160 may be simplified to any one of four directions such as an upward direction, a downward direction, a leftward direction, and a rightward direction. For example, in a case where a direction of the arrow is simplified to four directions such as an upward direction, a downward direction, a leftward direction, and a rightward direction, the provision control unit 2020 decomposes a direction directed from the center of the imaging range 132 toward a position of a work target into a component of the upward-downward direction and a component of the leftward-rightward direction. A greater component of the component of the upward-downward direction and the component of the leftward-rightward direction is used as a direction of the arrow of the guide 160.

Here, a process of determining a direction of the arrow of the guide 160 is performed as follows, for example, by using the marker 80 included in the captured image 134 generated by the camera 130. Note that, in FIG. 27, for better understanding of FIG. 27, only the marker 80 included in the imaging range 132 of the camera 130 is illustrated.

First, the provision control unit 2020 detects the marker 80 from the captured image 134, performs image analysis on the marker, and thus determines the predetermined space. The provision control unit 2020 determines a partial space representing the imaging range 132. Here, the imaging range 132 in FIG. 27 is a portion where an imaging range (partial space) of the camera 130 intersects the shelf 70 in a plan view. Therefore, the provision control unit 2020 determines the portion where the partial space intersects the shelf 70 in a plan view, and thus determines the imaging range 132. The provision control unit 2020 computes a direction directed from a predetermined position in the imaging range 132 toward a position of a work target indicated by work information, and uses the direction as a direction of the arrow of the guide 160.

<Hardware Configuration Example>

A hardware configuration of a computer realizing the information processing apparatus 2000 of Example Embodiment 2 is represented in, for example, FIG. 3 in the same manner as in Example Embodiment 1. However, a program module realizing the functions of the information processing apparatus 2000 of the present example embodiment is further stored in the storage device 1080 of the computer 1000 realizing the information processing apparatus 2000 of the present example embodiment.

As mentioned above, the example embodiments of the present invention have been described with reference to the drawings, but these are only examples of the present invention, and combinations of the example embodiments and various configurations other than the example embodiments may be employed.

Some of all of the example embodiments may be disclosed as in the following appendix, but are not limited thereto.

1. An information processing apparatus including:
   a provision control unit that acquires work information indicating a work target which is a target of work performed by a user, determines a work target satisfying a provision condition among work targets indicated by the acquired work information, and displays an operation image for selecting the determined work target on a display screen associated with a head mounted display in an operable manner; and
   an input detection unit that detects an input operation on the displayed operation image.

2. The information processing apparatus according to 1., in which the provision condition for a work target to which the corresponding operation image is not displayed on the display screen includes that a provision start condition which is a condition for starting display of the operation image is satisfied, and
   in which the provision control unit determines whether or not the work target to which the corresponding operation image is not displayed on the display screen satisfies the provision start condition, and displays the operation image corresponding to the work target satisfying the provision start condition on the display screen in an operable manner.

3. The information processing apparatus according to 2., in which the provision condition for a work target to which the corresponding operation image is displayed on the display screen includes that a provision finish condition which is a condition for finishing display of the operation image is not satisfied, and
   in which the provision control unit determines whether or not the work target to which the corresponding operation image is displayed on the display screen satisfies the provision finish condition, and does not display the operation image corresponding to the work target on the display screen or displays the operation image on the display screen in an inoperable manner in a case where the work target satisfies the provision finish condition.

4. The information processing apparatus according to 3., in which the provision finish condition for the work target includes that a predetermined time has elapsed after the provision start condition for the work target is not satisfied.

5. The information processing apparatus according to 3., in which the provision finish condition for the work target includes that one or more of work targets other than the work target satisfy the provision start condition after the provision start condition for the work target is not satisfied.

6. The information processing apparatus according to any one of 1. to 5.,
in which the provision control unit determines whether or not a predetermined part of a human is included in a captured image generated by a camera associated with the head mounted display, and displays the operation image satisfying the provision condition on the display screen in a case where it is determined that the predetermined part is included in the captured image.

7. The information processing apparatus according to any one of 2. to 6.,
in which the provision start condition for the work target includes that the work target is present within a predetermined range defined by a sensor.

8. The information processing apparatus according to 7.,
in which the predetermined range is an imaging range of a camera imaging a periphery of a user wearing the head mounted display.

9. The information processing apparatus according to any one of 2. to 6.,
in which the provision control unit estimates a health condition of a user on the basis of a measured value obtained from a sensor worn by the user of the head mounted display, and
in which the provision start condition for the work target includes that the health condition of the user satisfies a predetermined condition.

10. The information processing apparatus according to any one of 1. to 9.,
in which the input detection unit detects an operation of selecting any one of the operation images on the basis of an inclination of a device worn by a user of the head mounted display.

11. The information processing apparatus according to any one of 1. to 10.,
in which the input detection unit detects an input operation of selecting the operation image and an input operation of establishing the selection, and
in which the provision control unit
displays the operation image corresponding to the work target present within a predetermined range defined by a sensor on the display screen, and
brings an operation image corresponding to a work target present closest to a predetermined position in the predetermined range into a selection state.

12. The information processing apparatus according to any one of 1. to 11., further including:
a layout determination unit that determines a layout of the operation images to be displayed on the display screen by dividing a predetermined range on the display screen into a plurality of partial ranges, and associating the operation images with the respective partial ranges,
in which the provision control unit displays the operation images on the display screen according to the layout determined by the layout determination unit.

13. The information processing apparatus according to 12.,
in which the layout determination unit sets the number of partial ranges to be the same as the number of operation images satisfying the provision condition.

14. The information processing apparatus according to 12. or 13.,
in which a rank is assigned to each of the partial ranges according to a predetermined rule,
in which the provision control unit displays the operation image corresponding to the work target present within a predetermined range defined by a sensor on the display screen, and
in which the layout determination unit
assigns a rank to each work target satisfying the provision condition such that a higher rank is assigned to a work target closer to a predetermined position in an imaging range of a camera associated with the head mounted display, and
associates the partial range with the operation image such that the operation image corresponding to the work target assigned with the higher rank is associated with the partial range assigned with the higher rank.

15. The information processing apparatus according to 14.,
in which the layout determination unit sets a size of the partial range assigned with the highest rank to be larger than sizes of the other partial ranges.

16. The information processing apparatus according to 10., further including:
an operation range determination unit that divides a range of the inclination of the device into a plurality of partial ranges, and allocates the operation images to the respective partial ranges,
in which the input detection unit detects the inclination of the device, and detects that the operation image corresponding to the partial range including the detected inclination is selected.

17. The information processing apparatus according to 16.,
in which a rank is assigned to each of the partial ranges according to a predetermined rule,
in which the provision control unit displays the operation image corresponding to the work target present within a predetermined range defined by a sensor on the display screen, and
in which the operation range determination unit
assigns a rank to each work target satisfying the provision condition such that a higher rank is assigned to a work target closer to a predetermined position in an imaging range of a camera associated with the head mounted display, and
associates the partial range with the operation image such that the operation image corresponding to the work target assigned with the higher rank is associated with the partial range assigned with the higher rank.

18. The information processing apparatus according to 17.,
in which the operation range determination unit sets a size of the partial range assigned with the highest rank to be larger than sizes of the other partial ranges.

19. An information processing apparatus including:
a provision control unit that determines a work target satisfying a provision condition by using work information indicating a work target which is a target of work performed by a user, and outputs a voice representing the determined work target from a speaker associated with a head mounted display; and
an input detection unit that detects an input operation on the work target satisfying the provision condition.

20. A control method executed by a computer, the control method including:
a provision control step of determining a work target satisfying a provision condition by using work information indicating a work target which is a target of work performed by a user, and displaying an operation image for selecting the determined work target on a display screen associated with a head mounted display in an operable manner; and an input detection step of detecting an input operation on the displayed operation image.

21. The control method according to 20.,
in which the provision condition for a work target to which the corresponding operation image is not displayed on the display screen includes that a provision start condition which is a condition for starting display of the operation image is satisfied, and
in which, in the provision control step, it is determined whether or not the work target to which the corresponding operation image is not displayed on the display screen satisfies the provision start condition, and the operation image corresponding to the work target satisfying the provision start condition is displayed on the display screen in an operable manner.

22. The control method according to 21.,
in which the provision condition for a work target to which the corresponding operation image is displayed on the display screen includes that a provision finish condition which is a condition for finishing display of the operation image is not satisfied, and
in which, in the provision control step, it is determined whether or not the work target to which the corresponding operation image is displayed on the display screen satisfies the provision finish condition, and the operation image corresponding to the work target is not displayed on the display screen or the operation image is displayed on the display screen in an inoperable manner in a case where the work target satisfies the provision finish condition.

23. The control method according to 22.,
in which the provision finish condition for the work target includes that a predetermined time has elapsed after the provision start condition for the work target is not satisfied.

24. The control method according to 22.,
in which the provision finish condition for the work target includes that one or more of work targets other than the work target satisfy the provision start condition after the provision start condition for the work target is not satisfied.

25. The control method according to any one of 20. to 24.,
in which, in the provision control step, it is determined whether or not a predetermined part of a human is included in a captured image generated by a camera associated with the head mounted display, and the operation image satisfying the provision condition is displayed on the display screen in a case where it is determined that the predetermined part is included in the captured image.

26. The control method according to any one of 21. to 25.,
in which the provision start condition for the work target includes that the work target is present within a predetermined range defined by a sensor.

27. The control method according to 26.,
in which the predetermined range is an imaging range of a camera imaging a periphery of a user wearing the head mounted display.

28. The control method according to any one of 21. to 25.,
in which, in the provision control step, a health condition of a user is estimated on the basis of a measured value obtained from a sensor worn by the user of the head mounted display, and in which the provision start condition for the work target includes that the health condition of the user satisfies a predetermined condition.

29. The control method according to any one of 20. to 28.,
in which, in the input detection step, an operation of selecting any one of the operation images is detected on the basis of an inclination of a device worn by a user of the head mounted display.

30. The control method according to any one of 20. to 29.,
in which, in the input detection step, an input operation of selecting the operation image and an input operation of establishing the selection are detected, and
in which, in the provision control step,
the operation image corresponding to the work target present within a predetermined range defined by a sensor is displayed on the display screen, and
an operation image corresponding to a work target present closest to a predetermined position in the predetermined range is brought into a selection state.

31. The control method according to any one of 20. to 30., further including:
a layout determination step of determining a layout of the operation images to be displayed on the display screen by dividing a predetermined range on the display screen into a plurality of partial ranges, and associating the operation images with the respective partial ranges,
in which, in the provision control step, the operation images is displayed on the display screen according to the layout determined in the layout determination step.

32. The control method according to 31.,
in which, in the layout determination step, the number of partial ranges is set to be the same as the number of operation images satisfying the provision condition.

33. The control method according to 31. or 32.,
in which a rank is assigned to each of the partial ranges according to a predetermined rule,
in which, in the provision control step, the operation image corresponding to the work target present within a predetermined range defined by a sensor is displayed on the display screen, and
in which, in the layout determination step,
a rank is assigned to each work target satisfying the provision condition such that a higher rank is assigned to a work target closer to a predetermined position in an imaging range of a camera associated with the head mounted display, and
the partial range is associated with the operation image such that the operation image corresponding to the work target assigned with the higher rank is associated with the partial range assigned with the higher rank.

34. The control method according to 33.,
in which, in the layout determination step, a size of the partial range assigned with the highest rank is set to be larger than sizes of the other partial ranges.

35. The control method according to 29., further including:
an operation range determination step of dividing a range of the inclination of the device into a plurality of partial ranges, and allocating the operation images to the respective partial ranges,
in which, in the input detection step, the inclination of the device is detected, and it is detected that the operation image corresponding to the partial range including the detected inclination is selected.

36. The control method according to 35.,
in which a rank is assigned to each of the partial ranges according to a predetermined rule, in which, in the provision control step, the operation image corresponding to the work target present within a predetermined range defined by a sensor is displayed on the display screen, and in which, in the operation range determination step, a rank is assigned to each work target satisfying the provision condition such that a higher rank is assigned to a work target closer to a predetermined position in an imaging range of a camera associated with the head mounted display, and the partial range is associated with the operation image such that the operation image corresponding to the work target assigned with the higher rank is associated with the partial range assigned with the higher rank.

37. The control method according to 36., in which, in the operation range determination step, a size of the partial range assigned with the highest rank is set to be larger than sizes of the other partial ranges.

38. A control method including:

a provision control step of determining a work target satisfying a provision condition by using work information indicating a work target which is a target of work performed by a user, and outputting a voice representing the determined work target from a speaker associated with a head mounted display; and an input detection step of detecting an input operation on the work target satisfying the provision condition.

39. A program causing a computer to execute each step of the method according to any one of 20. to 38.

This application is based upon and claims the benefit of priority from Japanese Patent Application No. 2017-179849, filed Sep. 20, 2017; the entire contents whose are incorporated herein by reference.

The invention claimed is:

1. An information processing apparatus comprising:

a provision control unit that acquires work information indicating a work target which is a target of work performed by a user, determines a work target satisfying a provision condition among work targets indicated by the acquired work information, and displays an operation image for selecting the determined work target on a display screen associated with a head mounted display in an operable manner within a predetermined range defined by a sensor; and an input detection unit that detects an input operation on the displayed operation image, wherein the provision condition for a work target to which a corresponding operation image is not displayed on the display screen includes that a provision start condition is satisfied, the provision start condition being a condition for starting display of the operation image, wherein the provision control unit determines whether or not the work target to which the corresponding operation image is not displayed on the display screen satisfies the provision start condition, and displays the operation image corresponding to the work target satisfying the provision start condition on the display screen in an operable manner from a time when the provision start condition is satisfied to a time when a provision finish condition is satisfied, wherein the provision condition for a work target to which a corresponding operation image is displayed on the display screen includes that the provision finish condition is not satisfied, the provision finish condition being a condition for finishing display of the operation image, wherein the provision control unit determines whether or not the work target to which the corresponding operation image is displayed on the display screen satisfies the provision finish condition, and does not display the operation image corresponding to the work target without satisfying the provision finish condition on the display screen or displays the operation image on the display screen in an inoperable manner in a case where the work target satisfies the provision finish condition, and wherein the provision finish condition for the work target includes that, after the provision start condition for the work target becomes not satisfied, one or more other work targets satisfy the provision start condition.

2. The information processing apparatus according to claim 1, wherein the provision control unit determines whether or not a predetermined part of a human is included in a captured image generated by a camera associated with the head mounted display, and displays the operation image satisfying the provision condition on the display screen in a case where it is determined that the predetermined part is included in the captured image.

3. The information processing apparatus according to claim 1, wherein the provision start condition for the work target includes that the work target is present within a predetermined range defined by a sensor.

4. The information processing apparatus according to claim 3, wherein the predetermined range is an imaging range of a camera imaging a periphery of a user wearing the head mounted display.

5. The information processing apparatus according to claim 1, wherein the provision control unit estimates a health condition of a user on the basis of a measured value obtained from a sensor worn by the user of the head mounted display, and wherein the provision start condition for the work target includes that the health condition of the user satisfies a predetermined condition.

6. The information processing apparatus according to claim 1, wherein the input detection unit detects an operation of selecting any one of the operation images on the basis of an inclination of a device worn by a user of the head mounted display.

7. The information processing apparatus according to claim 1, wherein the input detection unit detects an input operation of selecting the operation image and an input operation of finalizing the selection, and wherein the provision control unit performs:

displaying the operation image corresponding to the work target present within a predetermined range defined by a sensor on the display screen, and setting an operation image corresponding to a work target present closest to a predetermined position in the predetermined range to a state of being selected.

8. The information processing apparatus according to claim 1, further comprising:

a layout determination unit that determines a layout of the operation images to be displayed on the display screen by dividing a predetermined range on the display screen into a plurality of partial ranges, and associating the operation images with the respective partial ranges, wherein the provision control unit displays the operation images on the display screen according to the layout determined by the layout determination unit.

9. The information processing apparatus according to claim 8,
wherein the layout determination unit sets the number of partial ranges to be a same as the number of operation images satisfying the provision condition.

10. The information processing apparatus according to claim 8,
wherein a rank is assigned to each of the partial ranges according to a predetermined rule,
wherein the provision control unit displays the operation image corresponding to the work target present within a predetermined range defined by a sensor on the display screen, and
wherein the layout determination unit performs:
assigning a rank to each work target satisfying the provision condition such that a higher rank is assigned to a work target closer to a predetermined position in an imaging range of a camera associated with the head mounted display, and
associating the partial range with the operation image such that the operation image corresponding to the work target assigned with the higher rank is associated with the partial range assigned with the higher rank.

11. The information processing apparatus according to claim 10,
wherein the layout determination unit sets a size of the partial range assigned with the highest rank to be larger than sizes of the other partial ranges.

12. The information processing apparatus according to claim 6, further comprising:
an operation range determination unit that divides a range of the inclination of the device into a plurality of partial ranges, and allocates the operation images to the respective partial ranges,
wherein the input detection unit detects the inclination of the device, and detects that the operation image corresponding to the partial range including the detected inclination is selected.

13. The information processing apparatus according to claim 12,
wherein a rank is assigned to each of the partial ranges according to a predetermined rule,
wherein the provision control unit displays the operation image corresponding to the work target present within a predetermined range defined by a sensor on the display screen, and
wherein the operation range determination unit performs:
assigning a rank to each work target satisfying the provision condition such that a higher rank is assigned to a work target closer to a predetermined position in an imaging range of a camera associated with the head mounted display, and
associating the partial range with the operation image such that the operation image corresponding to the work target assigned with the higher rank is associated with the partial range assigned with the higher rank.

14. The information processing apparatus according to claim 13,
wherein the operation range determination unit sets a size of the partial range assigned with the highest rank to be larger than sizes of the other partial ranges.

15. A control method executed by a computer, the control method comprising: determining a work target satisfying a provision condition by using work information indicating a work target which is a target of work performed by a user, and displaying an operation image for selecting the determined work target on a display screen associated with a head mounted display in an operable manner within a predetermined range defined by a sensor; and
detecting an input operation on the displayed operation image,
wherein the provision condition for a work target to which a corresponding operation image is not displayed on the display screen includes that a provision start condition is satisfied, the provision start condition being a condition for starting display of the operation image,
wherein determining whether or not the work target to which the corresponding operation image is not displayed on the display screen satisfies the provision start condition, and displays the operation image corresponding to the work target satisfying the provision start condition on the display screen in an operable manner from a time when the provision start condition is satisfied to a time when a provision finish condition is satisfied,
wherein the provision condition for a work target to which a corresponding operation image is displayed on the display screen includes that the provision finish condition is not satisfied, the provision finish condition being a condition for finishing display of the operation image,
wherein determining whether or not the work target to which the corresponding operation image is displayed on the display screen satisfies the provision finish condition, and does not display the operation image corresponding to the work target without satisfying the provision finish condition on the display screen or displays the operation image on the display screen in an inoperable manner in a case where the work target satisfies the provision finish condition, and
wherein the provision finish condition for the work target includes that, after the provision start condition for the work target becomes not satisfied, one or more other work targets satisfy the provision start condition.

16. A non-transitory computer-readable storage medium storing a program causing a computer to execute:
determining a work target satisfying a provision condition by using work information indicating a work target which is a target of work performed by a user, and displaying an operation image for selecting the determined work target on a display screen associated with a head mounted display in an operable manner within a predetermined range defined by a sensor; and
detecting an input operation on the displayed operation image,
wherein the provision condition for a work target to which a corresponding operation image is not displayed on the display screen includes that a provision start condition is satisfied, the provision start condition being a condition for starting display of the operation image,
wherein determining whether or not the work target to which the corresponding operation image is not displayed on the display screen satisfies the provision start condition, and displays the operation image corresponding to the work target satisfying the provision start condition on the display screen in an operable manner from a time when the provision start condition is satisfied to a time when a provision finish condition is satisfied,
wherein the provision condition for a work target to which a corresponding operation image is displayed on the display screen includes that the provision finish condition is not satisfied, the provision finish condition being a condition for finishing display of the operation image, wherein determining whether or not the work target to which the corresponding operation image is displayed on the display screen satisfies the provision finish condition, and does not display the operation image corresponding to the work target without satisfying the provision finish condition on the display screen or displays the operation image on the display screen in an inoperable manner in a case where the work target satisfies the provision finish condition, and wherein the provision finish condition for the work target includes that, after the provision start condition for the work target becomes not satisfied, one or more other work targets satisfy the provision start condition.

* * * * *